United States Patent
Ishii et al.

(10) Patent No.: US 12,020,423 B2
(45) Date of Patent: Jun. 25, 2024

(54) INSPECTING FOR A DEFECT ON A PRINT MEDIUM WITH AN IMAGE ALIGNED BASED ON AN OBJECT IN THE IMAGE AND BASED ON VERTICES OF THE INSPECTION TARGET MEDIUM AND THE REFERENCE MEDIUM

(71) Applicant: CANON KABUSHIKI KAISHA, Tokyo (JP)

(72) Inventors: Toshiyuki Ishii, Tokyo (JP); Toshihiro Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/062,213

(22) Filed: Dec. 6, 2022

(65) Prior Publication Data

US 2023/0102455 A1  Mar. 30, 2023

Related U.S. Application Data

(63) Continuation of application No. 17/173,986, filed on Feb. 11, 2021, now Pat. No. 11,551,350.

(30) Foreign Application Priority Data

Feb. 26, 2020 (JP) ................................ 2020-030849
Mar. 31, 2020 (JP) ................................ 2020-064202

(51) Int. Cl.
*G06T 7/00* (2017.01)
*G06K 15/00* (2006.01)
(Continued)

(52) U.S. Cl.
CPC ............ *G06T 7/001* (2013.01); *G06K 15/027* (2013.01); *G06K 15/408* (2013.01); *G06T 7/337* (2017.01);
(Continued)

(58) Field of Classification Search
CPC .................... G06T 7/001; G06T 7/337; G06T 2207/20212; G06T 2207/30144;
(Continued)

(56) References Cited

U.S. PATENT DOCUMENTS 5,751,854 A   5/1998  Saitoh
9,310,737 B2  4/2016  Kojima
(Continued)

FOREIGN PATENT DOCUMENTS

CN   103959047 A   7/2014
CN   108696663 A   10/2018
(Continued)

OTHER PUBLICATIONS

Extended European Search Report issued in European Appln. No. 21155978.6 mailed on Jul. 8, 2021.
(Continued)

*Primary Examiner* — Christopher Wait
(74) *Attorney, Agent, or Firm* — ROSSI, KIMMS & McDOWELL LLP

(57) ABSTRACT

There is provided with an image processing apparatus. An obtaining unit obtains a first image serving as a read image of an inspection target medium having undergone printing, and a second image serving as a read image of a reference medium representing a target print result. An inspection unit inspects a defect on the inspection target medium based on the first image and the second image by performing inspection at inspection settings different between a print region and a peripheral region of the inspection target medium.

10 Claims, 11 Drawing Sheets

(51) Int. Cl.
  *G06K 15/02* (2006.01)
  *G06T 7/33* (2017.01)

(52) U.S. Cl.
  CPC ............ *G06T 2207/20212* (2013.01); *G06T 2207/30144* (2013.01); *G06T 2207/30204* (2013.01)

(58) Field of Classification Search
  CPC . G06T 2207/30204; G06T 2207/10008; G06T 2207/20224; G06T 7/33; G06K 15/027; G06K 15/408; G03G 15/1615; G03G 15/167
  See application file for complete search history.

(56) References Cited

U.S. PATENT DOCUMENTS

| | | | |
|---|---|---|---|
| 9,767,546 | B2 | 9/2017 | Kojima et al. |
| 2011/0063682 | A1 | 3/2011 | Kanamoto |
| 2012/0121139 | A1 | 5/2012 | Kojima et al. |
| 2014/0168709 | A1* | 6/2014 | Tokumaru ............... G06T 7/001 358/1.18 |
| 2014/0314281 | A1* | 10/2014 | Kojima ............. H04N 1/00045 382/112 |

FOREIGN PATENT DOCUMENTS

| | | |
|---|---|---|
| JP | 2006088562 A | 4/2006 |
| JP | 2013046092 A | 3/2013 |
| JP | 2015065647 A | 4/2015 |
| JP | 2020008543 A | 1/2020 |
| KR | 1020140072206 A | 6/2014 |
| WO | 2014042280 A1 | 3/2014 |

OTHER PUBLICATIONS

Office Action issued in U.S. Appl. No. 17/173,986 mailed May 26, 2022.
Notice of Allowance issued in U.S. Appl. No. 17/173,986 mailed Sep. 14, 2022.
Office Action issued in Chinese Appln. No. 202110203882.1, mailed Dec. 25, 2023. English translation provided.

* cited by examiner

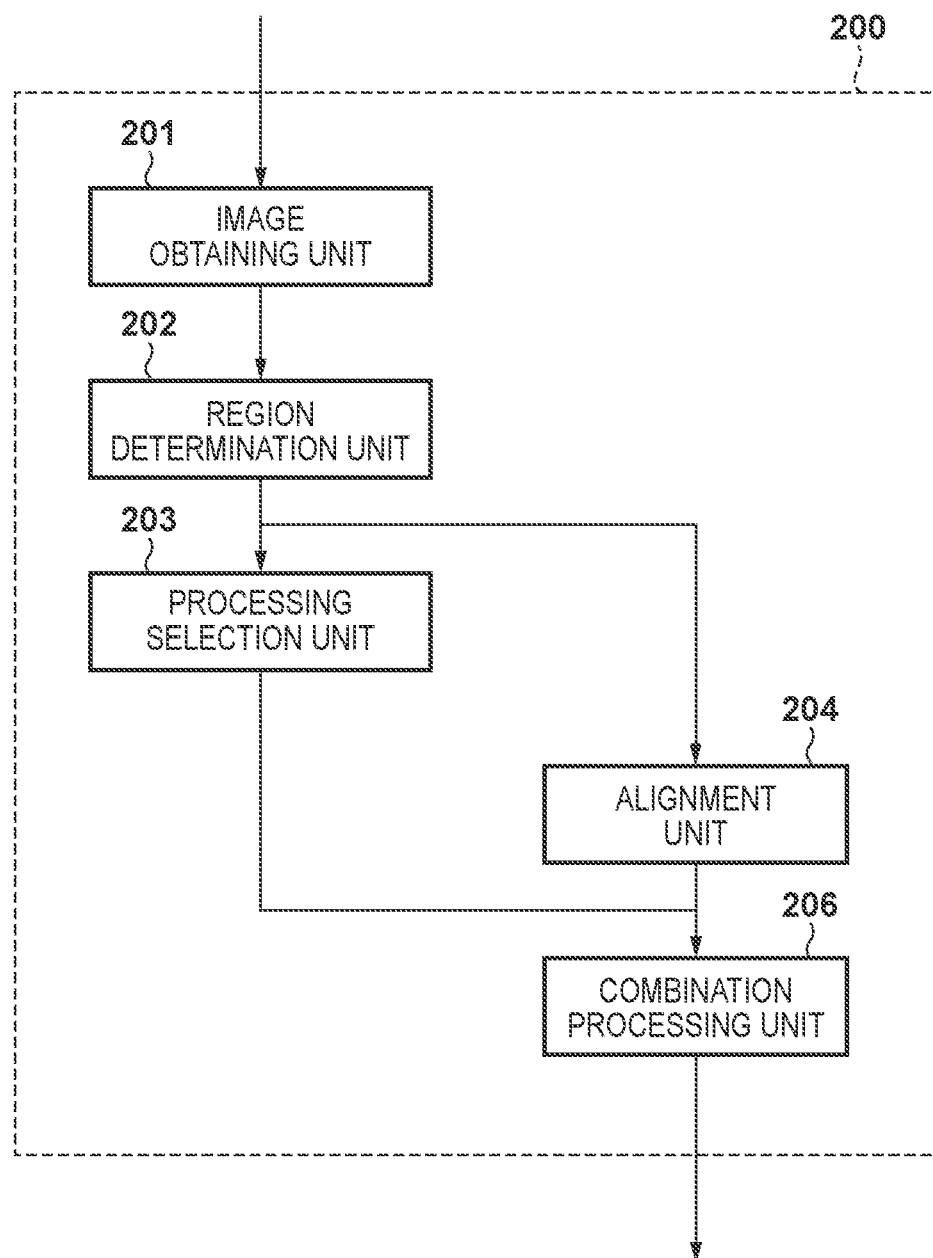

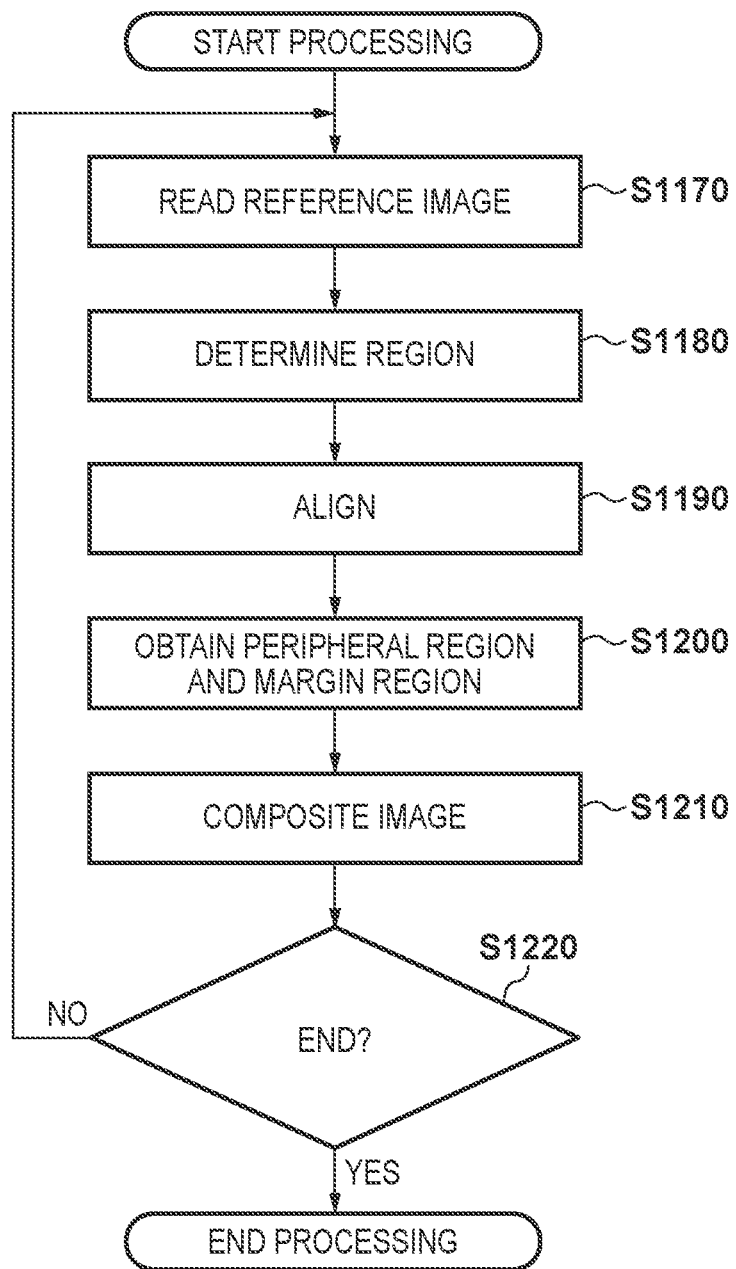

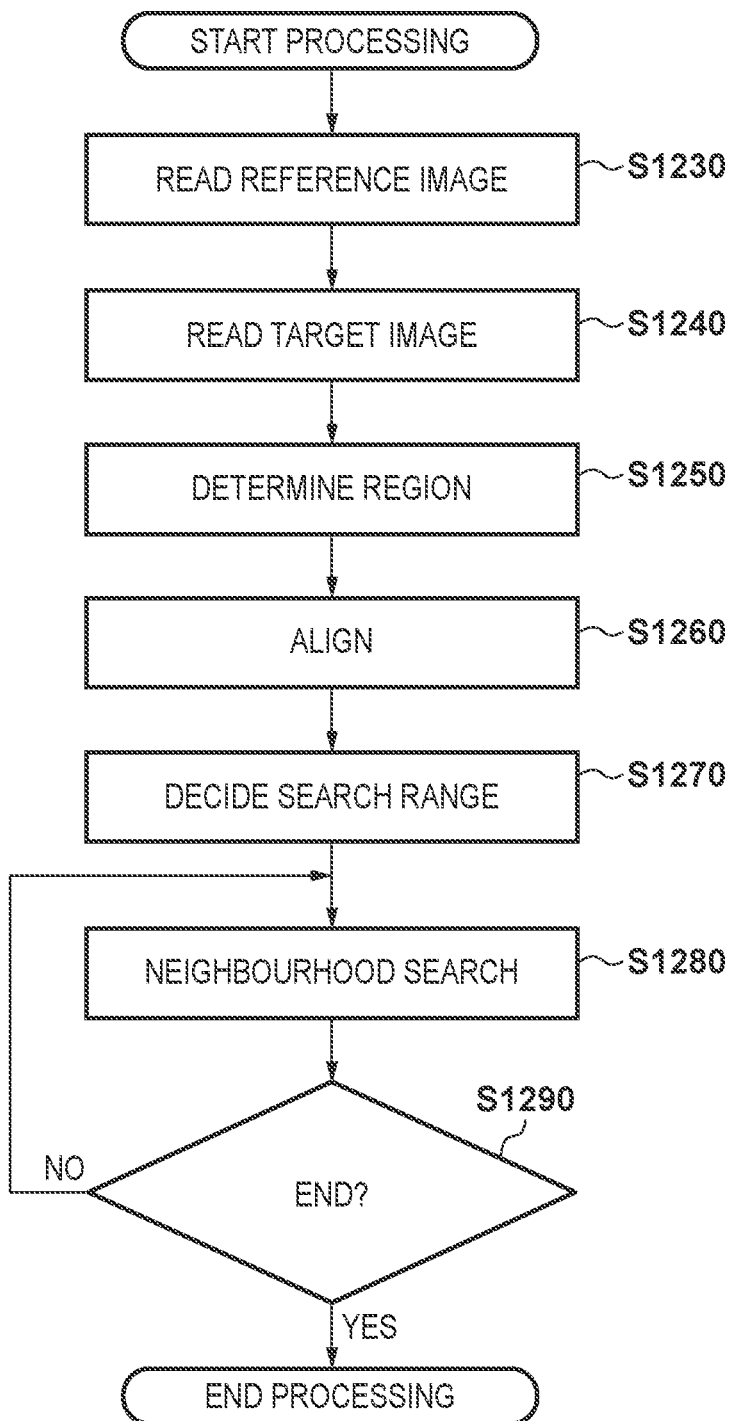

INSPECTING FOR A DEFECT ON A PRINT MEDIUM WITH AN IMAGE ALIGNED BASED ON AN OBJECT IN THE IMAGE AND BASED ON VERTICES OF THE INSPECTION TARGET MEDIUM AND THE REFERENCE MEDIUM

This application claims the benefit of Japanese Patent Application No. 2020-030849, filed Feb. 26, 2020, and Japanese Patent Application No. 2020-064202, filed Mar. 31, 2020, which are hereby incorporated by reference herein in their entirety.

BACKGROUND OF THE INVENTION

Field of the Invention

The present invention relates to a technique of detecting a defect on a printed product.

Description of the Related Art

A printed product output from a printing apparatus sometimes has a stain arising from attachment of a color material to an unintended portion, or a color loss arising from a failure of attachment of a sufficient amount of color material to a portion where an image should be formed. The quality of a printed product needs to be guaranteed by inspecting the presence/absence of such print defects. A visual inspection by an inspector requires a long time and high cost, so inspection systems that automatically perform inspection are proposed recently. Such an inspection system can detect the presence/absence of a print defect on an inspection target based on a difference between a reference image serving as image data representing a defect-free printed product, and a target image serving as image data of a printed product serving as the inspection target.

In general, the positional relationship between a medium and a picture printed on the medium slightly varies every printing owing to variations of a print position along with an error of a medium conveyance position in a printing apparatus, variations of the size of a medium along with an error of a cutting position, or the like. When automatically inspecting a printed product, alignment needs to be performed to make the pictures of a reference image and a target image match with each other. For example, Japanese Patent Laid-Open No. 2015-065647 discloses an apparatus that inspects a printed product by comparing a read image of a printed product with a master image. In Japanese Patent Laid-Open No. 2015-065647, a master image is obtained by aligning each of a read image of preprint paper before printing and a print image to be printed on the preprint paper with a read image of a printed product based on reference points such as edge points, and then compositing them.

SUMMARY OF THE INVENTION

According to an embodiment of the present invention, an image processing apparatus comprises: an obtaining unit configured to obtain a first image serving as a read image of an inspection target medium having undergone printing, and a second image serving as a read image of a reference medium representing a target print result; and an inspection unit configured to inspect a defect on the inspection target medium based on the first image and the second image by performing inspection at inspection settings different between a print region and a peripheral region of the inspection target medium.

According to another embodiment of the present invention, an image processing apparatus comprises: an obtaining unit configured to obtain a first image serving as a read image of a medium having undergone printing, and a second image different from the first image; and a compositing unit configured to composite the first image and the second image by performing compositing processing at compositing settings different between a print region and peripheral region of the medium.

According to still another embodiment of the present invention, an image processing method comprises: obtaining a first image serving as a read image of an inspection target medium having undergone printing, and a second image serving as a read image of a reference medium representing a target print result; and inspecting a defect on the inspection target medium based on the first image and the second image by performing inspection at inspection settings different between a print region and a peripheral region of the inspection target medium.

According to still another embodiment of the present invention, an image processing method comprises: obtaining a first image serving as a read image of a medium having undergone printing, and a second image different from the first image; and compositing the first image and the second image by performing compositing processing at compositing settings different between a print region and peripheral region of the medium.

According to yet another embodiment of the present invention, a non-transitory computer-readable medium stores a program which, when executed by a computer, causes the computer to perform a method comprising: obtaining a first image serving as a read image of an inspection target medium having undergone printing, and a second image serving as a read image of a reference medium representing a target print result; and inspecting a defect on the inspection target medium based on the first image and the second image by performing inspection at inspection settings different between a print region and a peripheral region of the inspection target medium.

According to yet another embodiment of the present invention, a non-transitory computer-readable medium stores a program which, when executed by a computer, causes the computer to perform a method comprising: obtaining a first image serving as a read image of a medium having undergone printing, and a second image different from the first image; and compositing the first image and the second image by performing compositing processing at compositing settings different between a print region and peripheral region of the medium.

Further features of the present invention will become apparent from the following description of exemplary embodiments (with reference to the attached drawings).

BRIEF DESCRIPTION OF THE DRAWINGS

FIG. 6 is a block diagram showing the functional arrangement of an image processing apparatus;

FIG. 11 is a flowchart showing a sequence of processing of generating the peripheral region of a reference image;

FIG. 12 is a flowchart showing a sequence of inspection processing for the peripheral region.

DESCRIPTION OF THE EMBODIMENTS

Figure 1:
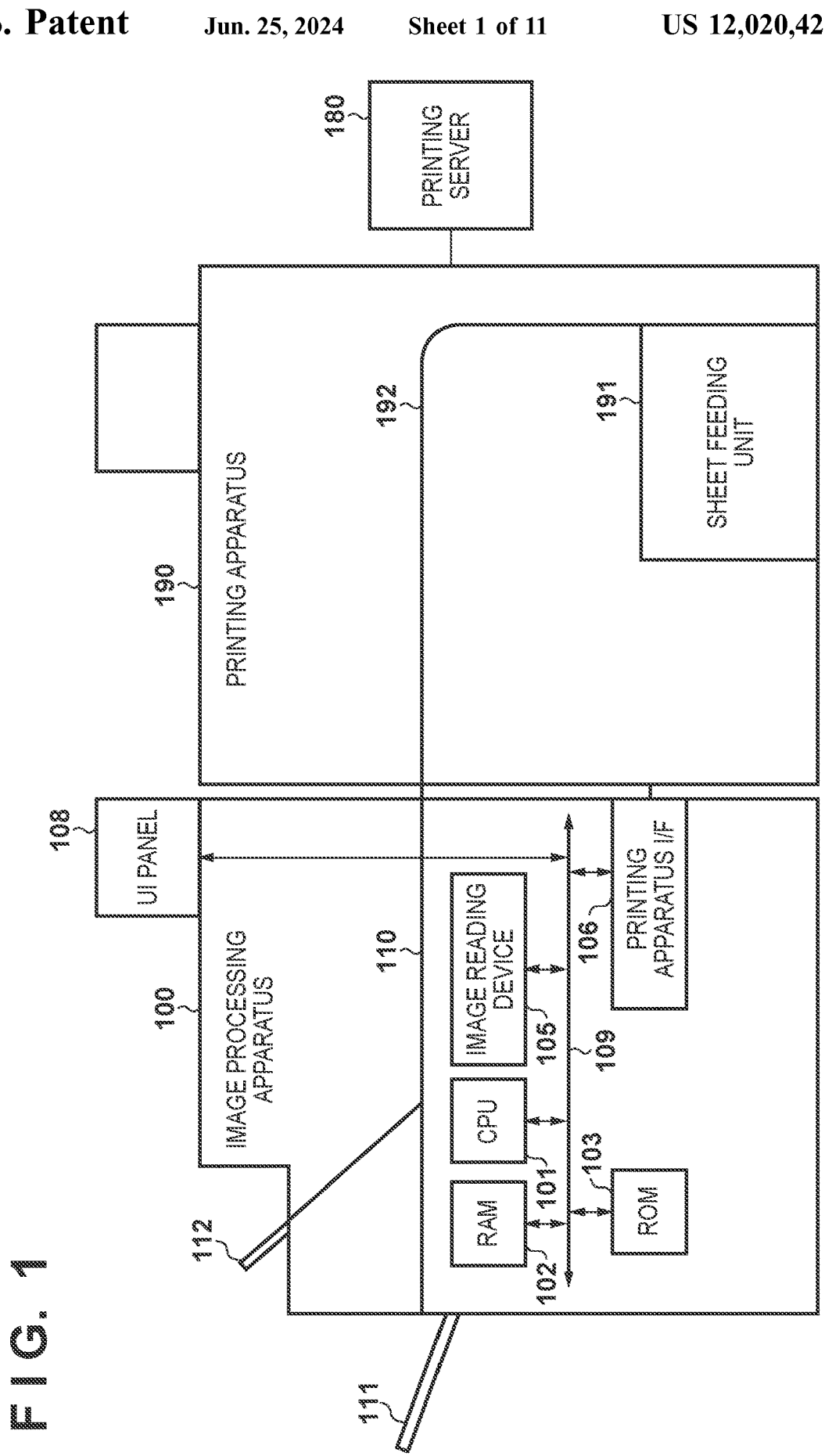
FIG. 1 is a view showing the arrangement of a printing system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

In Japanese Patent Laid-Open No. 2015-065647, a master image based on print image data used for printing and a read image of a printed product are compared. To guarantee the quality of an actual printed product, a read image of a defect-free printed product is desirably used as a reference image. However, when the positional relationship between a medium and a picture printed on the medium varies, as described above, if alignment is performed to make printed pictures in a target image and a reference image match with each other, the position of the periphery of the medium may change to increase a difference near the periphery of the medium. As a result, an inaccurate inspection result may be obtained at the periphery of the medium.

An embodiment of the present invention enables a proper inspection of a printed product even when a print position error occurs.

First Embodiment

An image processing apparatus according to the first embodiment inspects the presence/absence of a defect on an inspection target medium having undergone printing. In this embodiment, out of the inspection target medium, a region where printing is performed (region where a color material is fixed and a picture is formed; to be simply referred to as a picture region), and a region at the periphery of the medium where no printing is performed (to be simply referred to as an peripheral region) are determined, and inspection processing corresponding to each region is selected. According to the embodiment, even when a print position error occurs, a defect at the periphery of a medium can be detected more accurately.

(Arrangement of Printing System)

FIG. 1 is a view showing the arrangement of a whole printing system that includes an image processing apparatus 100 serving as an image processing apparatus according to the first embodiment, and performs output and inspection of a printed product. The printing system according to the first embodiment includes the image processing apparatus 100 and a printing apparatus 190. The printing system according to the first embodiment may further include a printing server 180.

The printing server 180 generates a print job including an original to be printed, and inputs the print job to the printing apparatus 190. The printing apparatus 190 forms an image on a print medium based on the print job input from the printing server 180. The printing apparatus 190 includes a sheet feeding unit 191, and the user can supply in advance print sheets to the sheet feeding unit 191. When the print job is input, the printing apparatus 190 forms an image on one or two surfaces of a print medium supplied to the sheet feeding unit 191 while conveying the print medium along a conveyance path 192. Then, the printing apparatus 190 sends the print medium to the image processing apparatus 100.

The image processing apparatus 100 inspects a defect on a print medium (inspection target medium) having undergone printing. The inspection target medium is obtained by forming an image on the print medium by the printing apparatus 190, and is conveyed through the conveyance path 192 inside the printing apparatus 190. The image processing apparatus 100 may incorporate a CPU 101, a RAM 102, and a ROM 103. The image processing apparatus 100 may include an image reading device 105, a printing apparatus interface (I/F) 106, a general-purpose interface (I/F), a user interface (UI) panel 108, and a main bus 109. Further, the image processing apparatus 100 may have a conveyance path 110 for a print medium that is connected to the conveyance path 192 of the printing apparatus 190. The image processing apparatus 100 may include an output tray 111 to which an inspection target medium determined to be accepted by inspection is output, and an output tray 112 to which an inspection target medium determined to be rejected by inspection is output. In the example of FIG. 1, the output trays 111 and 112 are connected to the CPU 101 via the main bus 109. The output tray 111 or 112 is set as the conveyance destination of an inspection target medium in accordance with the result of inspection on the inspection target medium.

The image processing apparatus according to each embodiment to be described later can be implemented by a computer including a processor and a memory. For example, the function of each unit shown in FIGS. 2, 6, and the like to be described later can be implemented by executing a program stored in a memory such as the RAM 102 or the ROM 103 by a processor such as the CPU 101. The processor such as the CPU 101 can also control each module in the image processing apparatus 100, as needed. Note that the image processing apparatus according to the embodiment of the present invention may be constituted by, for example, a plurality of processing apparatuses connected via a network.

The CPU 101 is a processor that controls each unit in the image processing apparatus 100. The RAM 102 temporarily holds an application executed by the CPU 101, data used for image processing, or the like. The ROM 103 stores programs executed by the CPU 101.

The image reading device 105 reads, on the conveyance path 110, one or two surfaces of a print medium sent from the printing apparatus 190, and obtains them as image data. Since the conveyance path 110 serves as a background when the image reading device 105 reads an image on a print medium, it can be constituted to have a color (for example, black) easily discriminable from a print medium on an image. The printing apparatus I/F 106 is connected to the printing apparatus 190, and the image processing apparatus 100 can communicate with the printing apparatus 190 via the printing apparatus I/F 106. For example, the printing apparatus 190 and the image processing apparatus 100 can be synchronized via the printing apparatus I/F 106 to notify each other of their operating situations. The UI panel 108 can output information to the user. The UI panel 108 may be a display device such as a liquid crystal display and can function as the user interface of the image processing apparatus 100. The UI panel 108 can notify the user of, for example, the current situation or settings of the image processing apparatus 100. The UI panel 108 may include an input device such as a touch panel or a button and can accept an instruction from the user. The main bus 109 is a transmission path that connects the modules of the image processing apparatus 100.

The image processing apparatus 100 performs inspection processing to check the presence/absence of a defect on a print medium based on image data of the print medium obtained by the image reading device 105 while the print medium output from the printing apparatus 190 is conveyed along the conveyance path 110. If the print medium is determined to be accepted as a result of the inspection processing, it is conveyed to the output tray 111. If the print medium is determined to be rejected as a result of the inspection processing, it is conveyed to the output tray 112. By this operation, only print media determined to have no defect are output onto the output tray 111.

(Functional Arrangement of Image Processing Apparatus)

Figure 2:
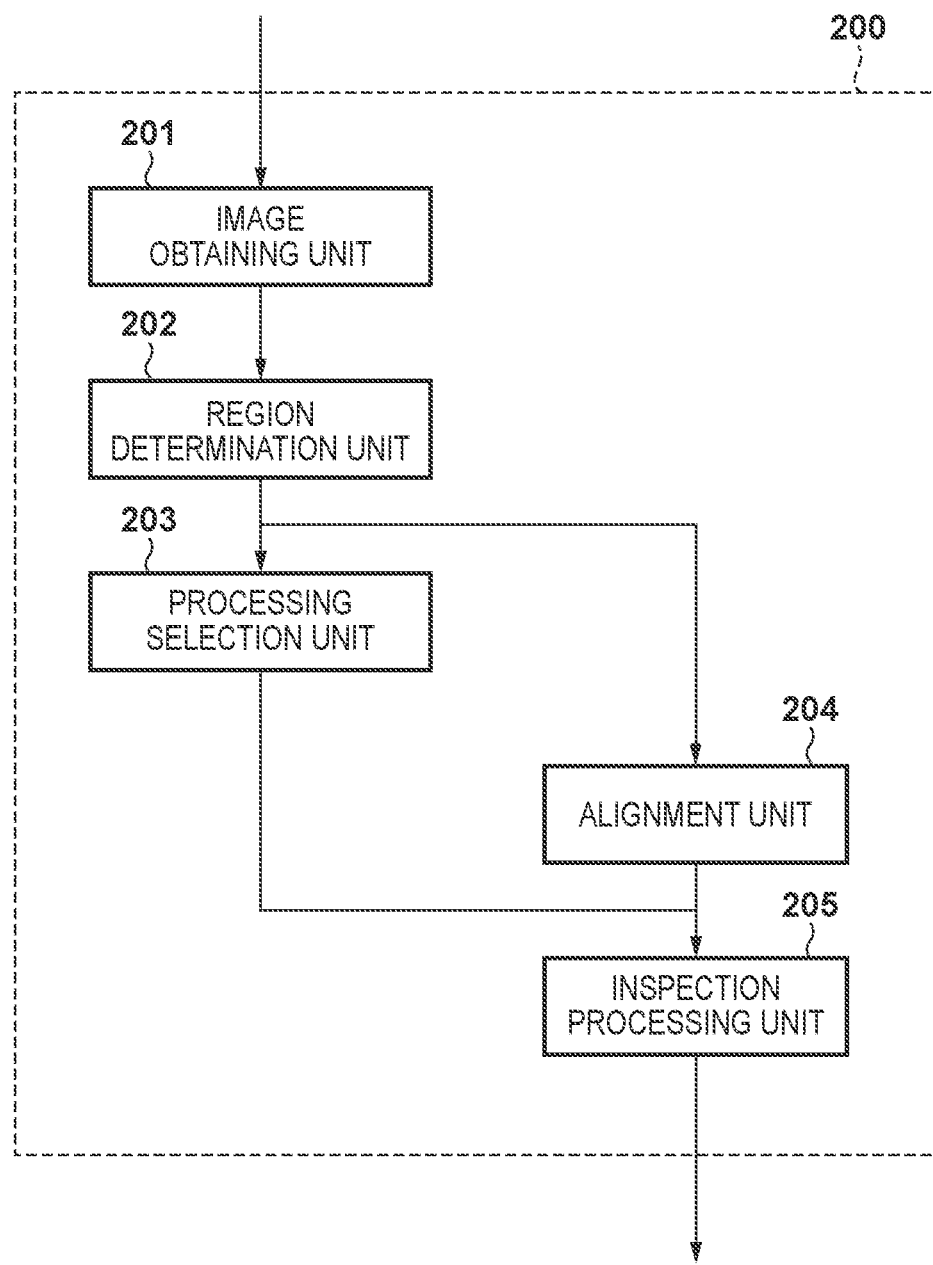
FIG. 2 is a block diagram showing the functional arrangement of an image processing apparatus.

FIG. 2 is a block diagram showing the functional arrangement of the image processing apparatus 100 according to the embodiment. Each rectangular frame represents a functional module that performs each processing according to the embodiment, and each arrow indicates a flow of data. The arrangement in FIG. 2 is merely an example, and the image processing apparatus 100 according to the embodiment is not limited to one shown in FIG. 2.

An image obtaining unit 201 obtains the first image serving as a read image of an inspection target medium having undergone printing, and the second image serving as a read image of a reference medium representing a target print result. In this embodiment, the image obtaining unit 201 obtains image data obtained by reading a print medium on the conveyance path 110 by the image reading device 105. The image reading device 105 reads print media at least at two different times and generates respective image data of the print media. An image obtained by reading a reference medium at the first time by the image reading device 105 will be called a reference image 301, and an image obtained by reading an inspection target medium at the second or subsequent time will be called a target image 302.

A region determination unit 202 determines a picture region 305 and a peripheral region 306 in each of the reference image 301 and the target image 302 obtained by the image obtaining unit 201. The region determination unit 202 can determine a region to which each pixel of image data belongs. In this embodiment, the region determination unit 202 divides the target image 302 into the picture region 305 and the peripheral region 306. The region determination unit 202 can also divide the reference image 301 into the picture region 305 and the peripheral region 306.

A processing selection unit 203 sets an inspection to be performed by an inspection processing unit 205 in accordance with the type of a region determined by the region determination unit 202. In this embodiment, the processing selection unit 203 selects inspection processing used for each of the picture region 305 and the peripheral region 306.

An alignment unit 204 aligns the reference image 301 and the target image 302. The alignment unit 204 can align images in accordance with the brightness of the images. For example, the alignment unit 204 can align the reference image 301 and the target image 302 based on objects in the images. More specifically, the alignment unit 204 can calculate a geometric correction parameter so that when geometric correction is performed on one image, an object in one image comes close to an object in the other image.

The alignment unit 204 according to the embodiment performs alignment with the reference image 301 for the picture region 305 of the target image 302. For example, the alignment unit 204 can calculate a position displacement amount between images in the picture regions 305 of the target image 302 and reference image 301 based on the brightness of the picture region 305 observed from each of the target image 302 and the reference image 301. The position displacement amount calculated in this embodiment can include a translation amount, a rotation amount, and a scaling amount.

The inspection processing unit 205 inspects a defect on an inspection target medium based on the reference image 301 and the target image 302. In this embodiment, the inspection processing unit 205 performs inspection at inspection settings different between the print region and peripheral region of an inspection target medium. The processing selection unit 203 makes inspection settings. In this embodiment, as for the print region (that is, the picture region 305 of the target image 302) of the inspection target medium, the inspection processing unit 205 determines a defect based on a comparison between the target image 302 and the reference image 301. For example, the inspection processing unit 205 can calculate a difference between the reference image 301 and the target image 302 and perform inspection in a state in which the alignment unit 204 aligns them. The inspection processing unit 205 can determine that a portion having a large difference between the reference image 301 and the target image 302 is a defective portion. As for the peripheral region (that is, the peripheral region 306 of the target image 302) of the inspection target medium, the inspection processing unit 205 determines a defect at an inspection setting different from that of the print region. A detailed method will be described later.

(Processing Executed by Image Processing Apparatus)

Figure 3:
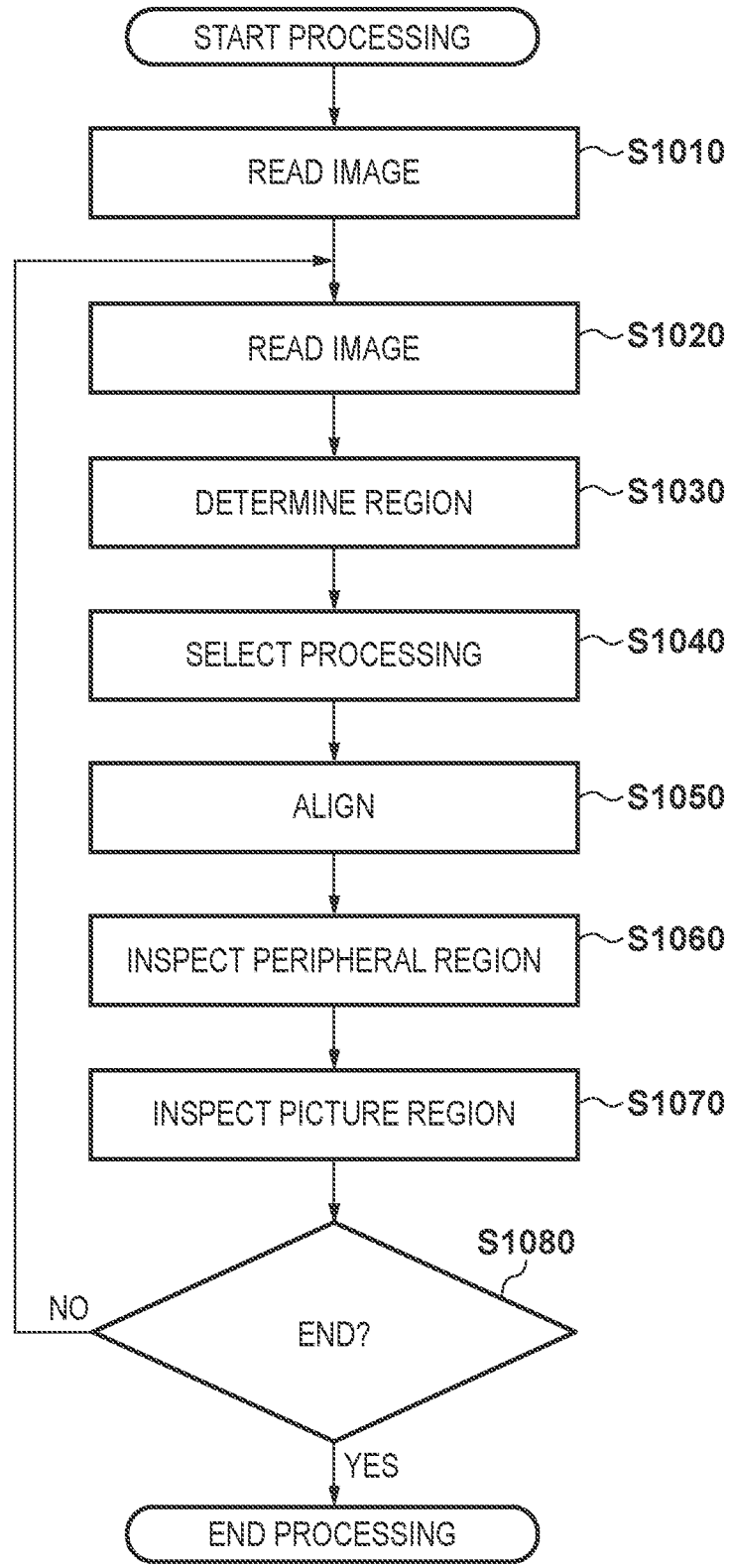
FIG. 3 is a flowchart showing a sequence of an image processing method.

Processing performed by the image processing apparatus 100 having the above-described arrangement according to the embodiment will be described below. FIG. 3 is a flowchart showing a sequence of processing performed by the image processing apparatus 100.

In step S1010, the image obtaining unit 201 obtains the reference image 301 obtained by reading a reference medium on the conveyance path 110 by the image reading device 105 in the above-described manner, and stores it in the RAM 102. The reference image 301 is used for subsequent processing to inspect each target image 302.

In step S1020, the image obtaining unit 201 obtains the target image 302 obtained by reading an inspection target medium on the conveyance path 110 by the image reading device 105 in the above-described manner, and stores it in the RAM 102. In subsequent steps S1030 to S1070, inspection of the target image 302 obtained in step S1020 is performed.

In step S1010, the image reading device 105 can generate the reference image 301 by reading the reference medium. In step S1020, the image reading device 105 can generate the target image 302 by reading the inspection target medium. The embodiment is also applicable to a case in which the reference image 301 or the target image 302 obtained using another device is used. For example, the reference image 301 or the target image 302 obtained by a device different from the image reading device 105 may be stored in an auxiliary storage device (not shown). In this case, the image obtaining unit 201 can obtain the reference image 301 or the target image 302 from the auxiliary storage device in step S1010 or S1020.

Figure 4A:
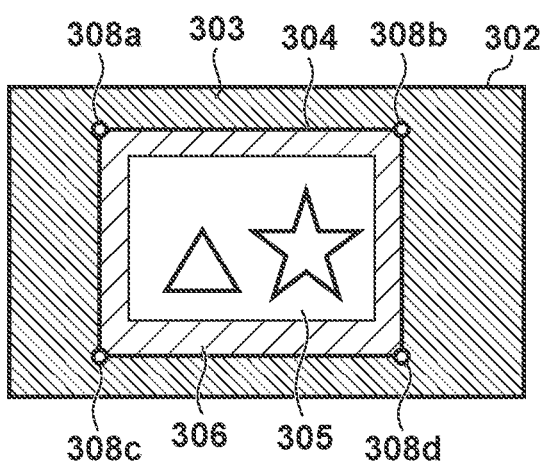
FIGS. 4A and 4B are views exemplifying a picture region 305 and a peripheral region 306.

FIG. 4A is a view showing an example of the target image 302. The target image 302 includes a print medium region 304 where a print medium is captured, and a background region 303 where no print medium is captured. In the example of FIG. 4A, the image reading device 105 reads the target image 302 so that the conveyance path 110 is captured as a background around the print medium region 304 in order to obtain the image of the entire print medium. In this embodiment, the conveyance path 110 is black, so the background region 303 becomes black. Similar to the target image 302, the reference image 301 includes a print medium region where a print medium is captured, and a background region where no print medium is captured.

In step S1030, the region determination unit 202 detects the picture region 305 and the peripheral region 306 in the target image 302 by performing region determination for the target image 302. In this example, the region determination unit 202 first extracts the print medium region 304 from the target image 302. The region determination unit 202 can extract the print medium region 304 in the following way. First, the region determination unit 202 binarizes the target image 302, traces pixels serving as the boundary between white pixels and black pixels, and linearly approximates four sides representing the outline of the print medium. As a result, four straight lines representing the outline of the print medium region 304 are estimated. Then, the region determination unit 202 calculates the intersection points of the four straight lines. The intersection points correspond to vertices 308a to 308d of the print medium region 304 shown in FIG. 4A. Needless to say, the method of extracting the print medium region 304 is not limited to the above-described one, and another method is also available.

Figure 4B:
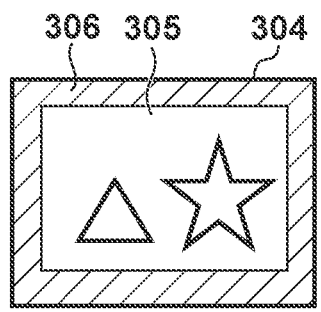

After that, the region determination unit 202 detects the picture region 305 and the peripheral region 306 from the print medium region 304 of the target image 302. In this embodiment, the region determination unit 202 determines to which of the picture region 305 and the peripheral region 306 each pixel constituting the print medium region 304 belongs. FIG. 4B shows the relationship between the target image 302, the print medium region 304, the picture region 305 (shown in FIG. 4B as a region where white and pictures exist), and the peripheral region 306 (hatched in FIG. 4B). In the example of FIG. 4B, the inside of the print medium region 304 belongs to either the picture region 305 or the peripheral region 306.

In this embodiment, the region determination unit 202 can determine, as the peripheral region 306, a region within a predetermined distance from the outline of the medium on the reference image 301 or the target image 302. For example, the region determination unit 202 can extract, as the peripheral region 306, a region within a predetermined distance from the outline of the print medium region 304, and extract the remaining region as the picture region 305. The predetermined distance that defines the peripheral region 306 can be called a peripheral margin and set in advance by the user prior to processing.

The method of detecting the peripheral region 306 is not limited to the above-described one. For example, the region determination unit 202 can detect a marker applied to a medium on the reference image 301 or the target image 302, and determine the peripheral region 306 based on the coordinates of the marker. More specifically, when an alignment marker such as a register mark is printed on a print medium, the region determination unit 202 may set a peripheral margin based on the coordinates of the alignment marker. The peripheral margin may be set based on a margin amount or a print position error amount when the printing apparatus 190 prints on a medium on the reference image 301 or the target image 302. For example, the region determination unit 202 may obtain information representing the average values of a margin size and print error amount at the time of printing from the printing apparatus 190, and set the sum of the average values of the margin size and print error amount as the peripheral margin. Further, the region determination unit 202 may determine the plain region of the print medium region 304 as the peripheral region 306 and the remaining region as the picture region 305.

In this embodiment, the region determination unit 202 calculates feature information (in this example, average brightness) about the peripheral region 306 detected from the reference image 301. The feature information is used in step S1060, details of which will be described later.

By performing similar processing on the reference image 301, the region determination unit 202 can extract the print medium region 304 of the reference image 301. Also, the region determination unit 202 can extract the picture region 305 and peripheral region 306 of the reference image 301. Note that the image obtaining unit 201 may extract the print medium region 304, picture region 305, and peripheral region 306 of the reference image 301 in step S1010.

In step S1040, the processing selection unit 203 selects the details of detection processing to be performed for the picture region 305 in step S1060, and those of inspection processing to be performed for the peripheral region 306 in step S1070. In step S1060, defect determination is performed for the picture region 305 at the settings selected by the processing selection unit 203. In step S1070, defect determination is performed for the peripheral region 306 at the settings selected by the processing selection unit 203. The details of inspection processing selected by the processing selection unit 203 can be set in advance by the user prior to processing. In this embodiment, the processing selection unit 203 selects defect determination processing based on a comparison between the reference image 301 and the target image 302 for the picture region 305, and defect determination processing based on a comparison between the target image 302 and feature information for the peripheral region 306.

In step S1050, the alignment unit 204 aligns the reference image 301 and the target image 302. In this embodiment, defect determination processing based on a comparison between the reference image 301 and the target image 302 is performed only for the picture region 305. Hence, the alignment unit 204 aligns the reference image 301 and the target image 302 based on the picture region 305.

Figure 5A:
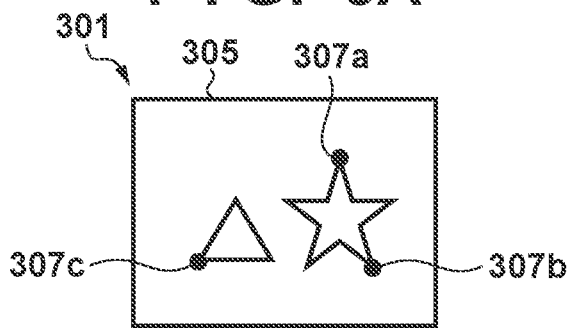
FIGS. 5A to 5C are views for explaining an outline of alignment processing.
Figure 5B:
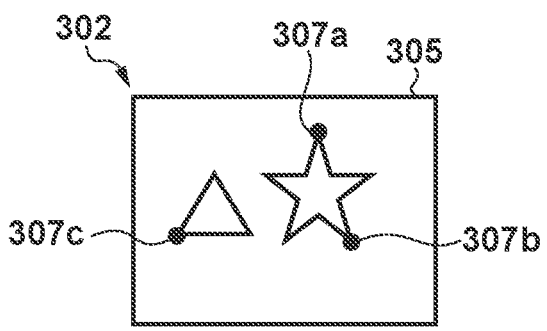
Figure 5C:
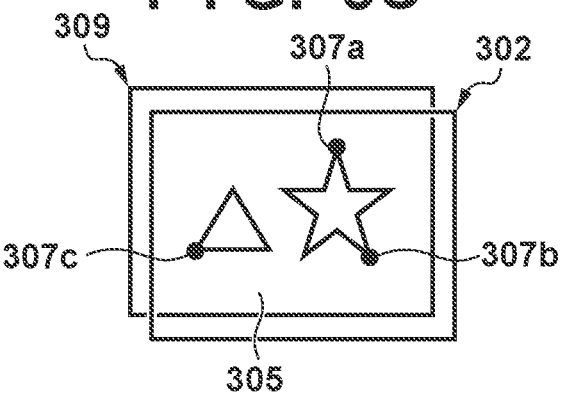

An example of processing performed by the alignment unit 204 will be explained with reference to FIGS. 5A to 5C showing an outline of alignment processing. FIG. 5A shows the picture region 305 and reference points 307a to 307c in the reference image 301. FIG. 5B shows the picture region 305 and the reference points 307a to 307c in the target image 302. The reference point 307 is a point indicating the same portion of the same object in the picture regions 305 of the reference image 301 and the target image 302, and is also called a feature point. In this embodiment, the three reference points 307a to 307c are set and used for alignment. In FIGS. 5A and 5B, the same reference numerals denote corresponding reference points. For example, the reference point 307a of the reference image 301 and the reference point 307a of the target image 302 indicate the same portions of a picture though the coordinates in the respective images are different. This also applies to the reference points 307b and 307c.

In this embodiment, the positions of the reference points 307a to 307c with respect to a picture to be printed by the printing apparatus 190 are set in advance. Note that the user may manually set the reference points 307a to 307c while checking the picture. The reference points 307a to 307c may be automatically set using an image feature amount such as SIFT or SURF. The alignment unit 204 can detect the set reference points 307a to 307c by image analysis on the picture regions 305 of the reference image 301 and the target image 302. In this embodiment, printing is performed on an inspection target medium in accordance with preset print data, so rough appearance positions of the reference points can be predicted. The alignment unit 204 can detect the reference points 307a to 307c by setting windows of a predetermined size (for example, 32×32 pixels) near the predicted positions of the reference points 307a to 307c, and performing template matching. As another method, the alignment unit 204 may detect the reference points 307a to 307c using processing of detecting an image feature amount such as SIFT or SURF mentioned above.

The alignment unit 204 detects the reference points 307a to 307c, obtaining the coordinates of the respective reference points 307a to 307c in each of the reference image 301 and the target image 302. The coordinates of the reference points 307a, 307b, and 307c in the reference image 301 are defined as (x1a, y1a), (x1b, y1b), and (x1c, y1c), respectively. The coordinates of the reference points 307a, 307b, and 307c in the target image 302 are defined as (x2a, y2a), (x2b, y2b), and (x2c, y2c).

Then, the alignment unit 204 aligns the reference image 301 and the target image 302 based on the positions of the corresponding reference points 307a to 307c detected from the reference image 301 and the target image 302. For example, when geometric transformation is applied to the reference image 301, the alignment unit 204 can calculate a geometric transformation for alignment so that the positions of the reference points 307a to 307c in the reference image 301 and the target image 302 match with each other. In this embodiment, the alignment unit 204 calculates a transformation X of the picture region 305 from the reference image 301 to the target image 302 according to equation (1):

$$AX = B \quad (1)$$

where $$A = \begin{pmatrix} x1a & y1a & 1 \\ x1b & y1b & 1 \\ x1c & y1c & 1 \end{pmatrix}$$

$$B = \begin{pmatrix} x2a & y2a & 1 \\ x2b & y2b & 1 \\ x2c & y2c & 1 \end{pmatrix}$$

$$X = \begin{pmatrix} x11 & x12 & x13 \\ x21 & x22 & x23 \\ 0 & 0 & 1 \end{pmatrix}$$

In equation (1), X is an affine transformation and represents a displacement amount obtained by combining translation, rotation, scaling, and shearing from the reference image 301 to the target image 302. The transformation X can be calculated by multiplying the inverse matrix of A from the right side of B in equation (1).

After that, the alignment unit 204 generates a transformed image 309 by applying the calculated transformation X to each pixel constituting the print medium region 304 in the reference image 301. As shown in FIG. 5C, the picture in the picture region 305 of the generated transformed image 309 is aligned with the target image 302. That is, the positions of the reference points 307a to 307c in the transformed image 309 and the target image 302 match with each other. In this manner, the alignment unit 204 can align the reference image 301 and the target image 302.

In step S1060, the inspection processing unit 205 performs for the peripheral region 306 inspection processing selected by the processing selection unit 203 in step S1040. As described above, in this embodiment, the inspection processing unit 205 performs defect determination processing based on a comparison between the target image 302 and feature information for the peripheral region 306. More specifically, the inspection processing unit 205 can detect a defect in the peripheral region 306 of the inspection target medium by comparing image information at each position of the peripheral region 306 of the target image 302 with feature information having a predetermined value.

The image information at each position of the peripheral region 306 of the target image 302 may be the brightness of each pixel. The feature information (to be referred to as a feature value hereinafter) having a predetermined value may be feature information about the peripheral region 306. The feature information may be, for example, the representative brightness of pixels belonging to the peripheral region 306. The representative brightness is a brightness representing the peripheral region 306. For example, when a print medium is white paper, the representative brightness may be the typical brightness of white paper read by the image obtaining unit 201.

In this embodiment, the inspection processing unit 205 uses, as the feature value, feature information about the peripheral region 306 of the reference image 301 obtained by the image obtaining unit 201. In this embodiment, the inspection processing unit 205 uses, as the feature value, the average brightness of the peripheral region 306 detected from the reference image 301 in step S1030. Then, the inspection processing unit 205 calculates a difference between the pixel value and the feature value for each pixel of the peripheral region 306 of the target image 302. The inspection processing unit 205 can determine that a pixel having a calculated difference larger than a threshold is a defective pixel.

Note that the inspection processing unit 205 may use a preset value as the feature value instead of the representative brightness of the peripheral region 306 detected from the reference image 301. For example, the feature value can be set in advance in accordance with the type of print medium. This setting can omit the processing of detecting the peripheral region 306 of the reference image 301 by the region determination unit 202. Even when a print position error occurs, a printed product can be inspected properly.

In step S1070, the inspection processing unit 205 performs for the picture region 305 inspection processing selected by the processing selection unit 203 in step S1040. As described above, in this embodiment, the inspection processing unit 205 performs defect determination processing based on a comparison between the reference image 301 and the target image 302 for the picture region 305. More specifically, the inspection processing unit 205 detects a defect in the picture region 305 of the inspection target medium by comparing the target image 302 and reference image 301 aligned based on objects in the images. As described above, the alignment unit 204 generates the transformed image 309 by alignment processing of the reference image 301 to the target image 302 in step S1050. The inspection processing unit 205 calculates a difference between the target image 302 and the transformed image 309 for each pixel of the picture region 305 in the target image 302. The inspection processing unit 205 can determine that a pixel having a calculated difference larger than a threshold is a defective pixel.

When the inspection processing unit 205 detects a defective pixel in step S1060 or S1070, the inspection target medium is determined to be rejected. At this time, the CPU 101 of the image processing apparatus 100 controls to convey the inspection target medium to the output tray 112. When the inspection processing unit 205 detects no defective pixel, the inspection target medium is determined to be accepted. At this time, the CPU 101 of the image processing apparatus 100 controls to convey the inspection target medium to the output tray 111.

In step S1080, the inspection processing unit 205 determines whether to convey the next inspection target medium to the image processing apparatus 100. If the printing apparatus 190 further prints on a print medium and the inspection target medium is conveyed to the image processing apparatus 100, the process returns to step S1020 to continue the processing in FIG. 3. If printing and inspection end, the processing in FIG. 3 ends.

In the above-described example, the alignment unit 204 aligns the reference image 301 and the target image 302 by transforming the reference image 301 using the transformation X in step S1050. Alternatively, the alignment unit 204 may align the target image 302 with respect to the reference image 301 by transforming the target image 302. For example, a transformed image can be generated by transforming the target image 302 using a different transformation Y. The transformation Y can be given by equation (2):

$$BY = A \quad (2)$$

In equation (2), the matrices A and B are the same as those in equation (1). In the transformed image, a picture in the picture region 305 is aligned with the reference image 301. In this case, the inspection processing unit 205 can calculate a difference between the reference image 301 and the transformed image in step S1070.

According to the first embodiment, inspection processing corresponding to a region is performed for each of the picture region and the peripheral region on an inspection target medium. With this arrangement, even when a print position error occurs, a defect at the periphery of a medium can be detected more accurately.

Modification to First Embodiment

In the first embodiment, defect determination processing based on a comparison between the reference image 301 and the target image 302 is used for the picture region 305, and defect determination processing based on a comparison between the target image 302 and feature information is used for the peripheral region 306. However, a combination of the inspection setting used for defect determination of the picture region 305 and the inspection setting used for defect determination of the peripheral region 306 is not limited to this. For example, the processing selection unit 203 may select defect determination processing based on a comparison between the reference image 301 and the target image 302 even for the peripheral region 306. In this case, the processing selection unit 203 can set, as the threshold used for defect determination by the inspection processing unit 205, values different between inspection of the picture region 305 and that of the peripheral region 306. For example, the inspection processing unit 205 can detect a defect in the picture region 305 of an inspection target medium by comparing with the first threshold a difference between the transformed image 309 and the target image 302 in the picture region 305. In contrast, the inspection processing unit 205 can detect a defect in the peripheral region 306 of the inspection target medium by comparing, with the second threshold different from the first threshold, a difference between the transformed image 309 and the target image 302 in the peripheral region 306. Even with this arrangement, an inspection can be performed at inspection settings different between the picture region 305 and the peripheral region 306.

The processing selection unit 203 detects a defect in the picture region 305 of an inspection target medium, whereas it can omit detection of a defect in the peripheral region 306 of the inspection target medium. For example, the inspection method may be set not to perform defect determination for the peripheral region 306 based on an input from the user or a setting. Even with this arrangement, an inspection can be performed at inspection settings different between the picture region 305 and the peripheral region 306. Further, the processing selection unit 203 may set the inspection method so as to perform defect determination using the same method between the picture region 305 and the peripheral region 306 based on an input from the user or a setting.

Second Embodiment

In the second embodiment, similar to the first embodiment, the presence/absence of a defect on an inspection target medium is inspected using inspection processing corresponding to each of the picture region and the peripheral region. In the second embodiment, in particular, a defect is determined based on a comparison between a reference image and a target image also for the peripheral region of an inspection target medium. In the second embodiment, alignment processing corresponding to each of the picture region and the peripheral region is performed to determine a defect at inspection settings different between the picture region and the peripheral region. The functional arrangement of an image processing apparatus 100 according to the second embodiment is similar to that of the image processing apparatus 100 according to the first embodiment shown in FIG. 2, and a difference from the first embodiment will be described below.

A processing selection unit 203 selects inspection settings for a picture region 305 and a peripheral region 306. In the second embodiment, the processing selection unit 203 selects the details of alignment processing for inspection of the picture region 305, and those of alignment processing for inspection of the peripheral region 306.

An alignment unit 204 aligns a reference image 301 and a target image 302 by the first method for inspection of the picture region 305. In the second embodiment, similar to the first embodiment, the alignment unit 204 aligns the reference image 301 and the target image 302 based on the picture region 305 for inspection of the picture region 305. An inspection processing unit 205 compares the aligned reference image 301 and the target image 302, detecting a defect in the picture region 305 of the inspection target medium. The alignment unit 204 aligns the reference image 301 and the target image 302 by the second method for inspection of the peripheral region 306. In the second embodiment, the alignment unit 204 aligns the reference image 301 and the target image 302 based on the periphery positions of the inspection target medium and reference medium for inspection of the peripheral region 306. The inspection processing unit 205 compares the aligned reference image 301 and the target image 302, detecting a defect in the peripheral region 306 of the inspection target medium. Details of this processing will be described below.

Processing performed by the image processing apparatus 100 according to the second embodiment will be described with reference to the flowchart of FIG. 3. Processes in steps S1010 to S1030 are similar to those in the first embodiment. In step S1040, the processing selection unit 203 selects the details of alignment processing for the picture region 305 and those of alignment processing for the peripheral region 306 that are performed in step S1050, as described above. In the second embodiment, similar to the first embodiment, alignment processing using affine transformation based on reference points 307a to 307c is selected for the picture region 305. For the peripheral region 306, alignment processing using affine transformation based on the positions of four vertices of a print medium is selected.

The reference image 301 and the target image 302 are aligned based on the picture region 305 in step S1050 similarly to the first embodiment. That is, the alignment unit 204 can calculate the transformation X based on the reference points 307a to 307c for the reference image 301, and generate a transformed image 309 by applying the transformation X to the reference image 301. In step S1050, the alignment unit 204 aligns the reference image 301 and the target image 302 based on the peripheral region 306.

Figure 8A:
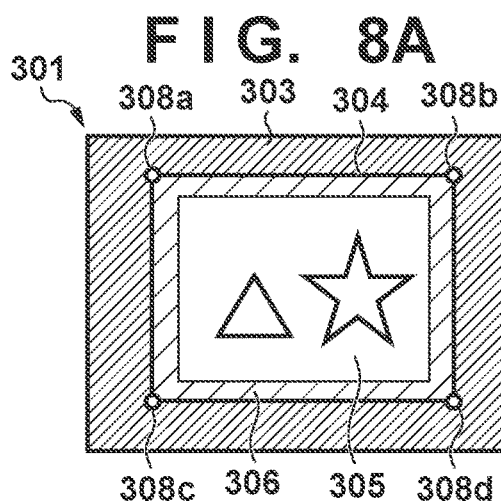
FIGS. 8A to 8C are views for explaining an outline of alignment processing.
Figure 8B:
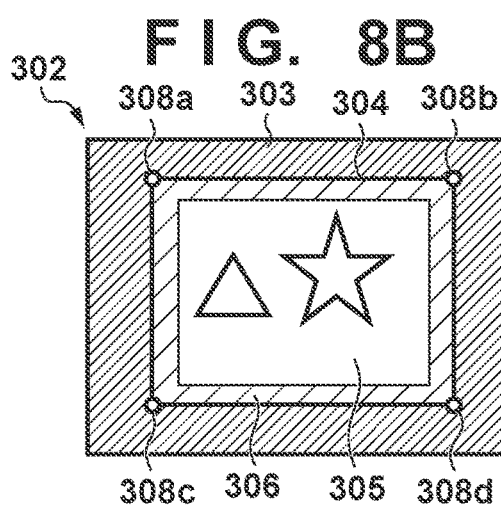
Figure 8C:
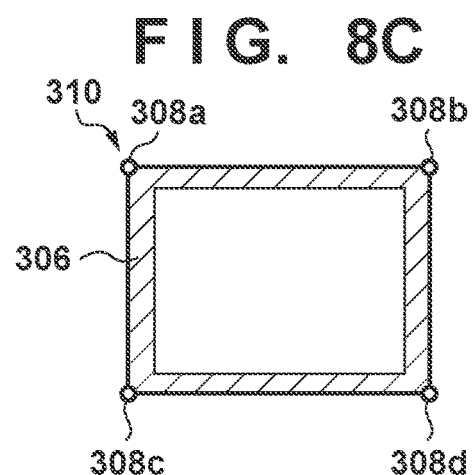

FIGS. 8A to 8C are views for explaining an outline of alignment processing based on the peripheral region 306. FIGS. 8A and 8B show the relationship between the reference image 301, the target image 302, the picture region 305, the peripheral region 306, and vertices 308a to 308d of a print medium region 304. The alignment unit 204 aligns the reference image 301 and the target image 302 based on the coordinates of the vertices 308a to 308d of the respective print medium regions 304 in the reference image 301 and the target image 302 that have been detected in step S1030. For example, when geometric transformation is applied to the reference image 301, the alignment unit 204 can calculate a geometric transformation for alignment so that the positions of the vertices 308a to 308d in the reference image 301 and the target image 302 match with each other. In this embodiment, the alignment unit 204 can calculate a transformation X' of the peripheral region 306 from the reference image 301 to the target image 302 according to equation (3):

$$A'X' = B' \quad (3)$$

where $$A = \begin{pmatrix} x1a & y1a & 1 \\ x1b & y1b & 1 \\ x1c & y1c & 1 \\ x1d & y1d & 1 \end{pmatrix}$$

$$B = \begin{pmatrix} x2a & y2a & 1 \\ x2b & y2b & 1 \\ x2c & y2c & 1 \\ x2d & y2d & 1 \end{pmatrix}$$

-continued $$X = \begin{pmatrix} x11 & x12 & x13 \\ x21 & x22 & x23 \\ 0 & 0 & 1 \end{pmatrix}$$

Since A' and B' in equation (3) are not square matrices, the alignment unit 204 calculates a Moore-Penrose pseudo-inverse matrix with respect to the matrix A' and can calculate X'.

The alignment unit 204 generates a periphery transformed image 310 by applying the calculated transformation X' to each pixel in the print medium region 304 of the reference image 301. FIG. 8C shows a state in which the target image 302 is aligned by alignment processing with the periphery transformed image 310 obtained by transforming the reference image 301 using the transformation X'. At this stage, the positions of the vertices 308a to 308d of the print medium regions 304 and the positions of the peripheral regions 306 in the periphery transformed image 310 and the target image 302 match with each other. To the contrary, the positions of the picture regions 305 in the periphery transformed image 310 and the target image 302 may not match with each other.

Figure 9A:
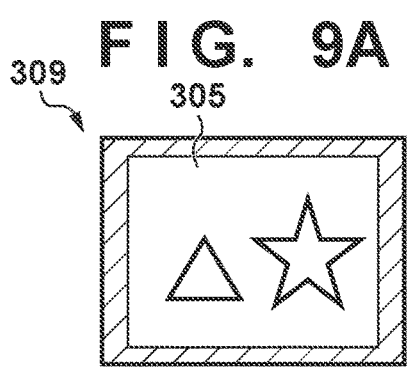
FIGS. 9A to 9C are views for explaining an overall transformed image.
Figure 9B:
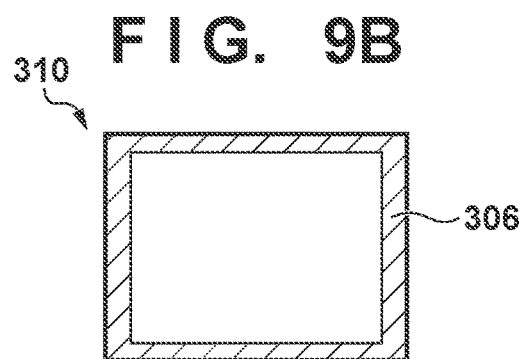
Figure 9C:
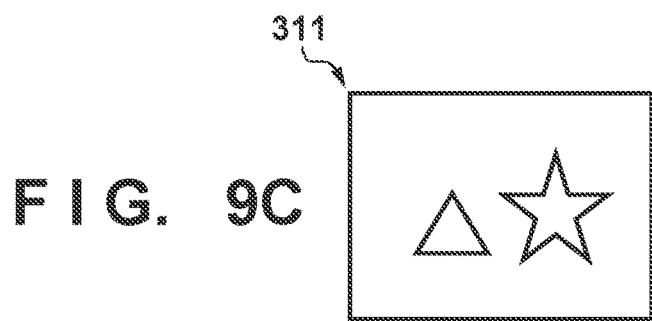

Finally, the alignment unit 204 generates an overall transformed image 311 by compositing the periphery transformed image 310 and the transformed image 309. FIGS. 9A to 9C are views for explaining the overall transformed image 311. The alignment unit 204 generates the overall transformed image 311 by combining an image corresponding to the picture region 305 of the target image 302 out of the transformed image 309 and an image corresponding to the position of the peripheral region 306 of the target image 302 out of the periphery transformed image 310. Since the picture region 305 and peripheral region 306 of the target image 302 do not overlap each other, the alignment unit 204 can generate the unique overall transformed image 311. The generated overall transformed image 311 corresponds to the result of aligning the overall reference image 301 with the target image 302.

In this embodiment, processes in steps S1060 and S1070 can be performed simultaneously. That is, the inspection processing unit 205 can calculate a difference between the target image 302 and the overall transformed image 311 for each pixel of the target image 302. The inspection processing unit 205 can determine that a pixel having a calculated difference larger than a threshold is a defective pixel. Processing in step S1080 is similar to that in the first embodiment. In this fashion, the processing according to the second embodiment can be performed.

Note that it is not essential to generate the overall transformed image 311 in step S1050. For example, a defect may be detected using different transformed images for the picture region 305 and the peripheral region 306. In this case, in step S1060, the inspection processing unit 205 can calculate a difference between the periphery transformed image 310 and the target image 302 for each pixel in the peripheral region 306, and compare the difference with a threshold. In step S1070, the inspection processing unit 205 can calculate a difference between the transformed image 309 and the target image 302 for each pixel in the picture region 305, and compare the difference with a threshold.

According to the second embodiment, inspection processing using different alignment processing corresponding to a region is performed for each of the picture region and the peripheral region on an inspection target medium. With this arrangement, even when a print position error occurs, a defect at the periphery of a medium can be detected more accurately. Especially in the second embodiment, image comparison is performed even in the peripheral region, and a defect near the periphery of a medium can be detected more accurately.

Third Embodiment

In the first and second embodiments, a defect in a target image is detected by comparing the target image with a reference image in at least the picture region. Even in a conventional technique, a defect in a target image is detected by comparing the target image with a reference image. In the first embodiment, a reference image is obtained by reading a reference medium. In the third embodiment, a reference image is generated based on the reading results of reference media. For example, in the third embodiment, a reference image can be generated based on read images obtained by reading respective reference media. This arrangement increases the S/N ratio of the reference image, and high accuracy of defect inspection is expected.

If a print position error occurs on each of reference media, read images need to be aligned before compositing them. If alignment is performed to make pictures match with each other even in this case, similar to the first and second embodiments, a mismatch at the peripheries of the media increases, and an improper reference image may be generated. Therefore, in the third embodiment, a picture region and a peripheral region on a reference medium are determined, and a plurality of read images are composited into a reference image by compositing processing corresponding to each region. The thus-generated reference image can be used to increase the accuracy of inspection according to the first and second embodiments. The reference image generated according to the third embodiment can also be used in inspection according to the conventional technique.

FIG. 6 is a block diagram showing the functional arrangement of an image processing apparatus 100 according to the third embodiment. The functional arrangement of the image processing apparatus 100 according to the third embodiment is similar to that of the image processing apparatus 100 according to the first embodiment shown in FIG. 2, and a difference from the first embodiment will be explained.

An image obtaining unit 201 obtains the first image serving a read image of a reference medium representing a target print result, and the second image different from the first image. In this embodiment, an image obtained by reading a reference medium at the first time by an image reading device 105 will be called the first read image, and an image obtained by reading another reference medium at the second or subsequent time will be called the second read image. The image obtaining unit 201 is similar to that in the first embodiment except that it obtains the first and second read images instead of a reference image 301 and a target image 302. The image obtaining unit 201 can obtain a plurality of second read images by reading respective reference images. The second read images can be sequentially composited to the first read image. The first read image or the first read image to which one or more second read images are composited will sometimes be called a processed image.

A region determination unit 202, a processing selection unit 203, and an alignment unit 204 are similar to those in the first embodiment except that they process the processed image and the second read image instead of the reference image 301 and the target image 302.

A compositing processing unit 206 composites the first and second read images. The compositing processing unit 206 can generate a reference image that is compared with a read image of an inspection target medium in order to detect a defect on the inspection target medium having undergone printing. The compositing processing unit 206 performs compositing processing at compositing settings different between a picture region 305 and peripheral region 306 of the medium. In this embodiment, the compositing processing unit 206 can generate a reference image by repeating compositing processing of the second read image to a processed image. An image obtained by compositing one second read image to a processed image will be called a composite image.

In this embodiment, the compositing processing unit 206 generates an image in the picture region 305 of a composite image by compositing a processed image and the second read image. The compositing processing unit 206 generates an image in the picture region 305 of the composite image by compositing the processed image and the second read image in accordance with alignment by the alignment unit 204. In this embodiment, the compositing processing unit 206 generates an image in the picture region 305 of the composite image by compositing the processed image and second read image aligned based on an object in the image.

The compositing processing unit 206 generates information used to inspect the peripheral region 306 on an inspection target medium at a compositing setting different from that of the picture region 305. The compositing processing unit 206 composites pieces of feature information of images in the peripheral regions 306 of media out of the processed image and the second read image. Such feature information can be used to inspect a peripheral region on an inspection target medium (target image 302) in the first embodiment. In the third embodiment, the compositing processing unit 206 sets a pixel value in the peripheral region 306 of a composite image at a feature value obtained by compositing the feature value of the peripheral region 306 of the processed image and that of the peripheral region 306 of the second read image. The obtained composite image including the picture region 305 in which the aligned processed image and the second read image are composited, and the peripheral region 306 having a predetermined pixel value can be used as a reference image in the first and second embodiments.

Figure 7:
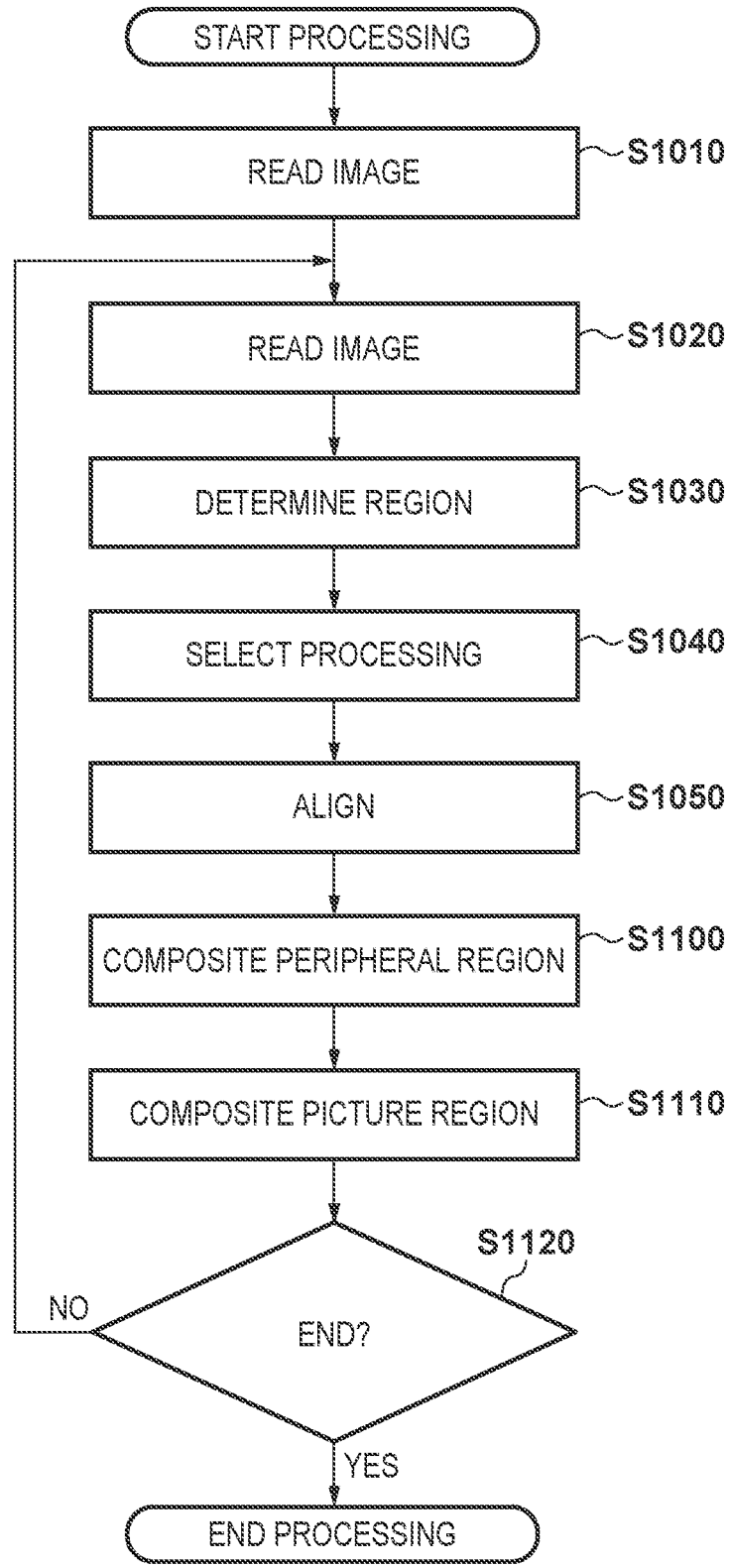
FIG. 7 is a flowchart showing a sequence of an image processing method.

Processing performed by the image processing apparatus 100 having the above-described arrangement according to the embodiment will be described below. FIG. 7 is a flowchart showing a sequence of processing performed by the image processing apparatus 100. In the processing shown in FIG. 7, a plurality of second read images are sequentially composited to the first read image.

In step S1010, the image obtaining unit 201 obtains the first read image similarly to the first embodiment except that the first read image is obtained instead of the reference image 301. The obtained first read image is used as a processed image. In step S1020, the image obtaining unit obtains the second read image similarly to the first embodiment except that one of the second read images is obtained instead of the target image 302.

In step S1030, the region determination unit 202 detects the picture region 305 and the peripheral region 306 in the processed image by performing region determination for the processed image similarly to the first embodiment. Similarly, the region determination unit 202 detects the picture region 305 and the peripheral region 306 in the second read image by performing region determination for the second read image. Further, the region determination unit 202 calculates a feature value for the peripheral region 306 of the second read image. The feature value is used in step S1100. Only in the first loop, the region determination unit 202 replaces, with the feature value of the peripheral region 306, the pixel values of all pixels belonging to the peripheral region 306 of the first read image (=processed image). As for the feature value, the feature value of the peripheral region 306 in this example is the average brightness of pixels belonging to the peripheral region 306, which will be described later.

In step S1040, the processing selection unit 203 selects the details of compositing processing to be performed for the picture region 305 in step S1100, and those of compositing processing to be performed for the peripheral region 306 in step S1110. In this embodiment, compositing processing based on averaging of the processed image and the second read image is selected for the picture region 305, and compositing processing based on the feature value is selected for the peripheral region 306. A detailed processing selection method is similar to that in the first embodiment.

In step S1050, the alignment unit 204 aligns the processed image and the second read image. In the third embodiment, similar to the first embodiment, the processed image and the second read image are aligned based on the picture region 305. For example, the alignment unit 204 can calculate the transformation X of the picture region 305 from the processed image to the second read image based on reference points. Then, similar to the first embodiment, the alignment unit 204 generates a transformed image by applying the calculated transformation X to each pixel constituting a print medium region 304 in the processed image. As a result, the alignment unit 204 can align the processed image and the second read image.

In step S1100, the inspection processing unit 205 performs for the peripheral region 306 compositing processing selected by the processing selection unit 203 in step S1040. As described above, in this embodiment, the compositing processing unit 206 performs compositing processing based on the feature value for the peripheral region 306. The feature value in this embodiment is the representative brightness of pixels belonging to the peripheral region 306. The significance of the feature value may be similar to that in the first embodiment. In this example, the average brightness of pixels belonging to the peripheral region 306 is used as the feature value.

For example, the compositing processing unit 206 performs compositing processing using the feature value for each pixel of the peripheral region 306 in the second read image. More specifically, the compositing processing unit 206 calculates the average of a feature value (in this example, the average brightness of the peripheral region 306) in the second read image and a feature value in the processed image for each pixel of the peripheral region 306.

As an example of the processing by the compositing processing unit 206, first, the compositing processing unit 206 can replace, with the feature value of the peripheral region 306, the pixel values of all pixels belonging to the peripheral region 306 of the second read image. In this example, the feature value is the average brightness of all pixels belonging to the peripheral region 306 of the second read image. The compositing processing unit 206 can calculate an average according to equation (4):

$$I_3(x,y) = (N \times I_1(x,y) + N \times I_2(x,y))/(N+1) \quad (4)$$

where x and y are indices of each pixel in the peripheral region 306, $I_1(x, y)$, $I_2(x, y)$, and $I_3(x, y)$ are pixel values in the processed image, the second read image, and the composite image, respectively, and N is the number of the second read image to be composited. In the case of processing the third, second read image, N=3.

As described above, the pixel value of the peripheral region 306 in the first read image is replaced with the average brightness of the peripheral region 306 of the first read image in step S1030. The pixel value of the peripheral region 306 in the second read image is also replaced with the average brightness of the peripheral region 306 of the second read image in step S1100. Therefore, all pixels (x, y) belonging to the peripheral regions 306 of the first and second read images have the same value. As a result, all the pixels of the peripheral region 306 have the same value even in a composite image obtained from the first read image (=processed image) and the second read image according to equation (4). The thus-obtained composite image is used as a processed image in the next processing loop, so all the pixels of the peripheral region 306 of the composite image have the same value even in subsequent processing loops. The $I_3(x, y)$ value obtained from equation (4) is the average value ($I_1(x, y)$) of the processed image and the average value ($I_2(x, y)$) of the second read image, which are weighted by the number of composited read images. In other words, the $I_3(x, y)$ value is the average brightness of the peripheral regions 306 of the first and second read images processed so far.

In step S1110, the compositing processing unit 206 performs for the picture region 305 compositing processing selected by the processing selection unit 203 in step S1040. As described above, in this embodiment, the compositing processing unit 206 performs compositing processing based on averaging of the processed image and the second read image for the picture region 305. For example, the compositing processing unit 206 can composite the second read image and a transformed image obtained from the processed image by alignment processing in step S1050 for each pixel of the picture region 305 in the second read image. More specifically, the compositing processing unit 206 can calculate the pixel value of each pixel (x, y) of the picture region 305 of the composite image using equation (4) described above (in this case, $I_1(x, y)$ is the pixel value of the transformed image). In steps S1100 and S1110, the composite image including the picture region 305 and the peripheral region 306 is generated.

In step S1120, the compositing processing unit 206 determines whether there is a read image of a reference medium which has not been composited yet. When compositing a read image of the next reference medium, the image obtaining unit 201 replaces the processed image with the composite image. After that, the process returns to step S1020 to composite the processed image with the second read image of a new reference medium. In steps S1100 and S1110 in the next processing loop, the N value used in equation (4) is incremented by one.

If the compositing processing unit 206 determines in step S1120 that read images of all reference media have been composited, the generated composite image is output to an auxiliary storage device (not shown), and the processing in FIG. 7 ends. As described above, the output composite image can be used as the reference image 301 in the first and second embodiments. By using the composite image generated in this way as the reference image 301, high accuracy of inspection processing in the first and second embodiments is expected.

In the above-described example, the compositing processing unit 206 generates a composite image by sequentially calculating an average according to equation (4) while repeating steps S1020 to S1120. However, the composite image generation method is not limited to this. For example, in step S1020, the image obtaining unit 201 can obtain a plurality of second read images as the reading results of a plurality of reference media. In steps S1100 and S1110, the compositing processing unit 206 may composite all the first and second read images. For example, the compositing processing unit 206 can calculate an average using equation (5) instead of equation (4):

$$I_3(x,y)=(I_1(x,y)+I_{21}(x,y)+I_{22}(x,y)+ \ldots +I_{2N-1}(x,y))/N \quad (5)$$

where N is the total number of read images, $I_1(x, y)$ is the pixel value of the first read image, and $I_{21}(x, y)$ to $I_{2N-1}(x, y)$ are the pixel values of respective second read images. Even in this case, the pixel value of the peripheral region 306 of the composite image is the average of the feature values of the peripheral regions 306 in the first and second read images. The pixel value of the picture region 305 of the composite image is the average pixel value of each pixel after the first and second read images are aligned based on the picture of the picture region 305.

The compositing processing unit 206 may adopt the median of the pixels of the first and second read images as the pixel value of the composite image. In this case, the compositing processing unit 206 can calculate the pixel value of the composite image using equation (6) instead of equation (5):

$$I_3(x,y)=\text{median}(I_1(x,y),I_{21}(x,y),I_{22}(x,y), \ldots ,I_{2N-1}(x,y)) \quad (6)$$

where median is the function of calculating a median.

In this embodiment, the pixel value of the peripheral region 306 in a read image is replaced with the average brightness of the peripheral region 306. Then, read images are composited according to equation (4) or the like, generating a composite image in which the peripheral region 306 has a predetermined pixel value. However, the compositing processing unit 206 may generate feature information about the peripheral region 306 of a reference image by another method. For example, the compositing processing unit 206 may calculate the average brightness of the peripheral regions 306 of the first and second read images and output it as feature information about the peripheral region 306 of the reference image. This feature information can be used as feature information about the peripheral region 306 having a predetermined value that is compared with image information at each position of the peripheral region 306 of the target image 302 in the first embodiment. In this case, the compositing processing unit 206 can output a reference image generated by compositing a processed image and second read image aligned based on an object in the picture region 305, and feature information about the peripheral region 306 of this reference image. As another example, the compositing processing unit 206 may generate a reference image by compositing a processed image and second read image aligned based on an object in the picture region 305, and replacing the pixel value of the peripheral region 306 of the obtained image with the feature information.

According to the third embodiment, a reference image is obtained by determining the picture region and peripheral region of a reference medium, and compositing read images of a plurality of reference media using compositing processing corresponding to each region. With this arrangement, even when a print position error occurs, a more proper inspection reference image can be generated.

Fourth Embodiment

Also in the fourth embodiment, the picture region and peripheral region of a reference medium are determined, and a plurality of read images are composited into a reference image by compositing processing corresponding to each region. Especially in the fourth embodiment, the compositing processing of a reference image is performed at compositing settings different between the picture region and the peripheral region by performing alignment processing corresponding to each of the picture region and the peripheral region. The functional arrangement of an image processing apparatus 100 according to the fourth embodiment is similar to that of the image processing apparatus 100 according to the third embodiment shown in FIG. 6, and a difference from the third embodiment will be described below.

A processing selection unit 203 selects the details of compositing processing for a picture region 305 and a peripheral region 306. In the fourth embodiment, similar to the second embodiment, as the details of alignment processing performed for the compositing processing of the picture region 305, the processing selection unit 203 selects alignment processing based on reference points in the picture region 305. Also similar to the second embodiment, as the details of alignment processing performed for the compositing processing of the peripheral region 306, the processing selection unit 203 selects alignment processing based on the positions of four vertices of a print medium in the peripheral region 306. The details of alignment processing performed by an alignment unit 204 are similar to those in the second embodiment.

Even in the fourth embodiment, a compositing processing unit 206 generates a composite image. Similar to the third embodiment, the picture region 305 of the composite image is a composite image of a processed image and second read image aligned based on an object in the image. The peripheral region 306 of the composite image is a composite image of a processed image and second read image aligned based on the periphery position of the medium. The thus-obtained composite image can also be used as a reference image in the first and second embodiments.

Processing performed by the image processing apparatus 100 having the above-described arrangement according to the embodiment will be described with reference to the flowchart of FIG. 7. Processes in steps S1010 to S1030 are similar to those in the third embodiment. Processing in step S1040 is also similar to that in the third embodiment except that the processing selection unit 203 selects the details of compositing processing in the above-described manner.

In step S1050, the alignment unit 204 performs processing as in the second embodiment except that a processed image and the second read image are aligned. By processing in step S1050, the transformation X' of the peripheral region 306 from the processed image to the second read image, and the transformation X of the picture region 305 from the processed image to the second read image are obtained. An overall transformed image obtained by the processing in step S1050 has, in a region corresponding to the position of the peripheral region 306 of the second read image, a peripheral transformed image obtained by transforming the processed image using the transformation X'. Further, the overall transformed image has, in a region corresponding to the position of the picture region 305 of the second read image, a transformed image obtained by transforming the processed image using the transformation X.

In step S1100, the compositing processing unit 206 generates a composite image by compositing the overall transformed image obtained in step S1050 and the second read image. In this embodiment, the compositing processing unit 206 can perform calculation according to equation (4) for each pixel of the print medium region 304 (that is, both the picture region 305 and the peripheral region 306) of the second read image. In this case, $I_1(x, y)$ represents the pixel value of the overall transformed image. In this fashion, a composite image having the pixel value $I_3(x, y)$ calculated according to equation (4) can be generated. Processing in step S1120 is similar to that in the third embodiment.

According to the fourth embodiment, even when a print position error occurs, a more proper inspection reference image can be generated. Particularly in the fourth embodiment, image compositing processing is performed even in the peripheral region, and a defect near the periphery of a medium can be detected more accurately.

Fifth Embodiment

Figure 10A:
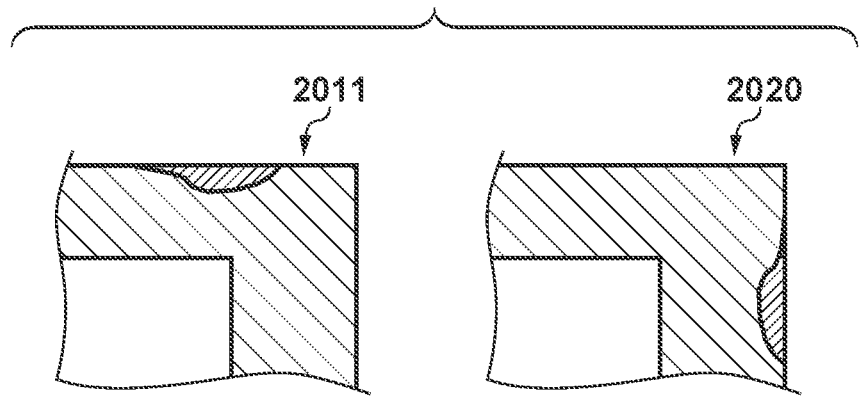
FIGS. 10A and 10B are views for explaining defect detection at the periphery of a print medium.
Figure 10B:
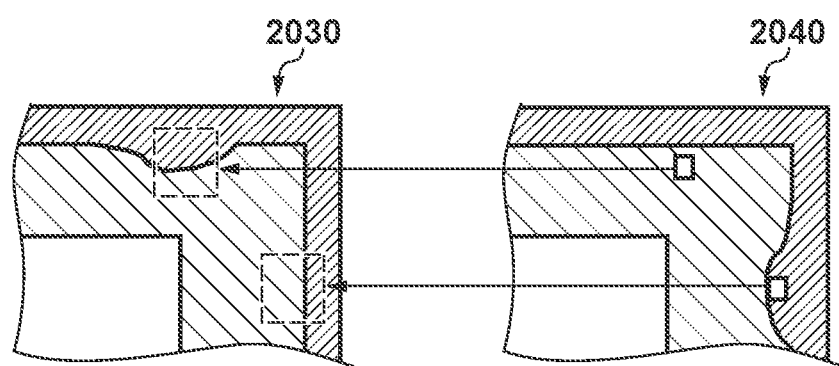

In the second embodiment, alignment processing based on the positions of four vertices of a print medium in the peripheral region 306 is performed as an alignment method when performing inspection of the peripheral region 306. In the fifth embodiment, when comparing the pixel values of a target image and a reference image, pixels in a predetermined search range are compared as shown in FIG. 10B, details of which will be described later. The inspection of a peripheral region 306 can therefore be performed using images in inspection ranges cut out from the reference image and the target image to have a region of a predetermined number of pixels around a print medium region 304.

This arrangement can increase the defect detection accuracy when a wrinkle or a distortion exists at the periphery of a print medium. For example, as shown in the enlarged view of FIG. 10A, a reference image 2011 obtained by compositing read images of a plurality of reference media may have a dark portion generated by compositing paper white and a black background at the periphery of the image. In addition, the black background portion may be captured at a periphery corresponding to the paper white portion of the print medium region 304 in a target image 2020. According to the embodiment, when a black region or a dark region is generated in the peripheral region of the reference image or the target image, detection of the region as a defect can be suppressed.

First, a method of generating a reference image by compositing read images of a plurality of reference media in this embodiment will be explained. According to the following method, a reference image can be generated to include a background region at the periphery. However, it is not essential to use the reference image generated as follows for inspection of an inspection target medium.

Processing in the fifth embodiment is different from that in the fourth embodiment in processing of compositing the peripheral regions of a plurality of reference images. This processing in the fifth embodiment will be described below with reference to the flowchart of FIG. 11. The following processing can be used in combination with processes such as alignment and compositing processing of a picture region in the fourth embodiment. That is, a composite image can be generated by performing compositing processing of a picture region 305 according to steps S1030 to S1110 in FIG. 7 while compositing the peripheral region 306 and a margin region according to steps S1180 to S1210 in FIG. 11.

In step S1170, an image obtaining unit 201 obtains the second read image as in step S1020 of the fourth embodiment. In step S1180, a region determination unit 202 extracts a margin region in addition to the peripheral region 306. The margin region is a region of a predetermined pixel width provided on upper, lower, right, and left sides around the peripheral region 306 (or print medium region 304). Although the pixel width is not particularly limited, the predetermined pixel width is set to 20 pixels in the following description. Similar to the above-described peripheral margin, a predetermined pixel width may be set based on a margin amount or print position error amount generated when a printing apparatus 190 prints. For example, the margin region can be extracted to include the black region of the background. If an error of the print position of the printing apparatus with respect to the print medium is about 10 pixels, the width of the margin region can be set to about 10 pixels. A mechanism for setting a predetermined pixel width by the user may be provided separately.

In step S1190, an alignment unit 204 aligns a processed image and the second read image based on the peripheral region 306 as in step S1050 of the fourth embodiment. That is, the alignment unit 204 can perform alignment processing based on the positions of four vertices of a print medium in the peripheral region 306. Similar to the fourth embodiment, the alignment unit 204 can transform the processed image so as to align the processed image with the second read image.

In step S1200, the alignment unit 204 obtains regions corresponding to the peripheral region 306 and the margin region from the transformed processed image obtained in step S1190. The obtained image includes black pixels corresponding to the background region around the print medium region 304, like a reference image 2030 in FIG. 10B.

In step S1210, the compositing processing unit 206 composites the second read image and the transformed processed image obtained in step S1190 in the peripheral region 306 and the margin region. In this way, the compositing processing unit 206 can generate the peripheral region 306 and margin region of the composite image serving as a composite image of the processed image and second read image aligned based on the periphery position of the medium. The compositing processing unit 206 can generate a composite image by sequentially calculating an average according to equation (4) as in the fourth embodiment for both the peripheral region 306 and the margin region. In the fifth embodiment, the compositing processing unit 206 may calculate a difference in pixel value between images and if the difference exceeds a predetermined threshold, employ the pixel value of an image having a smaller pixel value without averaging, in order to hold the contrast between the margin region and paper white at the periphery of the image. Instead of calculating a difference in pixel value, the compositing processing unit 206 may adopt another method of, for example, when the pixel value of the second read image is smaller than a predetermined threshold, replacing it with a predetermined pixel value representing a black region.

As described above, similar to the fourth embodiment, the compositing processing unit 206 can generate the picture region 305 and margin region of the composite image serving as a composite image of the processed image and second read image aligned based on the picture region 305. Accordingly, the composite image including the picture region 305, the peripheral region 306, and the margin region can be generated.

Processing in step S1220 is similar to that in the fourth embodiment. After the end of compositing read images of all reference media, the generated composite image is output to an auxiliary storage device (not shown), and the processing ends. By this processing, a reference image in which read images of reference media including the background region at the periphery is obtained.

Next, processing in the fifth embodiment in which an inspection target medium is inspected by comparing a target image and a reference image including the background region at the periphery will be explained with reference to the flowchart of FIG. 12. In step S1230, the image obtaining unit 201 obtains a reference image including the background region at the periphery. The reference image may be a composite image generated according to the above-described method by compositing read images of a plurality of reference media. In step S1240, the image obtaining unit 201 obtains a target image as in step S1020 of the second embodiment.

In step S1250, an inspection processing unit 205 extracts the picture region 305, the peripheral region 306, and the margin region from the target image. The method of extracting the picture region 305 and the peripheral region 306 is similar to that in the second embodiment. The method of extracting the margin region has been described above. The inspection processing unit 205 can generate an image in which the margin region is provided around the periphery of the print medium region 304.

In step S1260, similar to the second embodiment, the inspection processing unit 205 aligns the reference image obtained in step S1230 and the processed image obtained in step S1250. For example, the inspection processing unit 205 can transform the reference image into an overall transformed image by performing alignment for the picture region 305 and alignment for the peripheral region 306. As for the margin region as well as the peripheral region 306, the inspection processing unit 205 can perform alignment based on the positions of four vertices of the print medium.

In step S1270, the inspection processing unit 205 decides a search range used to compare the pixel values of the reference image and the target image. In this embodiment, the margin region around the print medium region 304 is also extracted, and a detection error in the peripheral region can be suppressed by comparing pixel values in a predetermined range. The size of the search range is not particularly limited and can be 20 pixels, which is equal to the width of the margin region in the following description. Alternatively, similar to the width of the margin region, the size of the search range may be determined based on a margin amount or a print position error amount when the printing apparatus 190 prints.

In step S1280, the inspection processing unit 205 calculates the difference value of each value between the target image and the reference image in the peripheral region 306. As shown in FIG. 10B, the inspection processing unit 205 can calculate a difference value between the pixel value of a pixel of interest of a reference image 2040 and the pixel value of each pixel of the reference image 2030 in the search range that corresponds to the pixel of interest. The search range may be a region whose vertical and horizontal distances from a pixel corresponding to the pixel of interest in the reference image are equal to or shorter than the number of pixels decided in step S1270. In this embodiment, the inspection processing unit 205 can calculate a difference value for each pixel by scanning the reference image in the vertical and horizontal directions by the number of pixels corresponding to the search range, and employ a minimum difference value as a difference used for defect determination.

In step S1290, the inspection processing unit 205 determines whether the calculation of a difference value has ended for all the pixels of the target image. If the calculation has not ended, the process returns to step S1280 to calculate a difference value for another pixel. If the calculation has ended, the inspection processing unit 205 determines based on the difference value whether the pixel of the peripheral region 306 of the target image is a defective pixel, similarly to the second embodiment. Then, the inspection processing ends.

In the fifth embodiment, an inspection image having a margin region around a print medium region is used. When comparing the pixel values of peripheral regions, a minimum value among the difference values of pixels in a predetermined range is adopted as a difference value used for defect determination. For example, even when the pixel of interest of a target image represents paper white and a corresponding pixel of a reference image represents the background, if a pixel of the same color (pixel representing paper white) as that of the pixel of interest exists near the corresponding pixel of the reference image, the pixel is not determined as a defect. Even when the pixel of interest of a target image represents the background and a corresponding pixel of a reference image represents paper white, if a pixel of the same color (pixel representing the background) as that of the pixel of interest exists near the corresponding pixel of the reference image, the pixel is not determined as a defect. With this arrangement, a defect near the periphery of a medium can be detected more accurately while suppressing a detection error.

Sixth Embodiment

In the above-described embodiments, inspection and alignment are performed for each of the picture region and the peripheral region. However, inspection or alignment may be performed at an inspection setting or alignment setting for three or more regions. In the sixth embodiment, a method will be described in which a preprint region is newly added to inspection target regions and an image on a print medium is divided into three regions and processed. The preprint region is the region of an image printed in advance on a print medium before actual printing by a printing apparatus. Note that the preprint region may exist at the center of the print medium.

Figure 13:
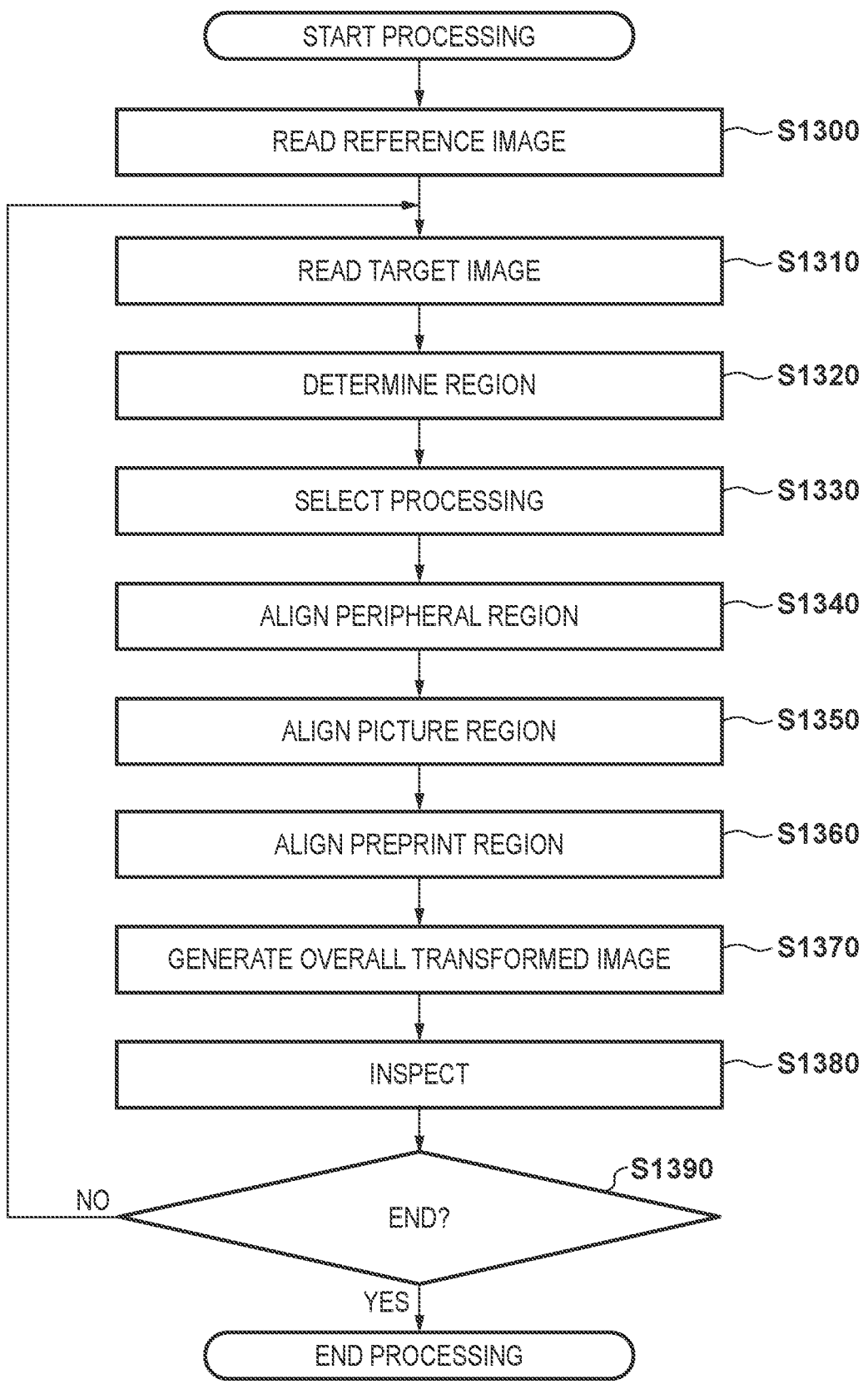
FIG. 13 is a flowchart showing a sequence of inspection processing including inspection of a preprint region.

Alignment processing and inspection processing for the preprint region in the sixth embodiment, which is a difference from the second embodiment, will be explained below with reference to the flowchart of FIG. 13. Alignment processing and inspection processing for the picture region and the peripheral region in the sixth embodiment are similar to those in the second embodiment, and a description thereof will not be repeated.

In step S1300, as in step S1010 of the second embodiment, an image obtaining unit 201 obtains a reference image serving as a read image of a reference medium representing a target print result. In step S1310, as in step S1020 of the second embodiment, the image obtaining unit 201 obtains a target image serving as a read image of an inspection target medium having undergone printing.

In step S1320, a region determination unit 202 performs region determination on the target image. In this embodiment, the region determination unit 202 extracts a picture region, a peripheral region, and a preprint region from the target image. The region determination unit 202 can extract the picture region, the peripheral region, and the preprint region by referring to a region map image. The region map image is used to discriminate a preprint region and can be created in advance by the user. The region map image is an image having the same vertical and horizontal widths as those of a processed image, and a different pixel value is stored for each region. For example, the pixel of the picture region may have a pixel value (R, G, B)=(255, 255, 255), that of the peripheral region may have a pixel value (R, G, B)=(0, 0, 0), and the preprint region may have a pixel value (R, G, B)=(128, 128, 128). Needless to say, the pixel value of the pixel of each region is not limited to this value. In this case, the region determination unit 202 may extract a print medium region from the target image similarly to the second embodiment, and extract the picture region, the peripheral region, and the preprint region from the print medium region based on the region map image. Instead of using the region map image, the region determination unit 202 may perform region determination based on feature information of an image similarly to the second embodiment.

In step S1330, a processing selection unit 203 selects an inspection setting for each region. In this embodiment, inspection is performed at the inspection setting of the preprint region printed in advance on an inspection target medium and those of the print region and peripheral region of the inspection target medium. For example, similar to the second embodiment, the processing selection unit 203 can select alignment based on the picture region (that is, an object in the image) for the picture region, and alignment based on the periphery position of the medium for the peripheral region. As for the preprint region, the processing selection unit 203 can select alignment based on the periphery position of the medium.

In step S1340, similar to the second embodiment, an alignment unit 204 performs alignment processing at the inspection setting for the peripheral region. In step S1350, similar to the second embodiment, the alignment unit 204 performs alignment at the inspection setting for the picture region.

In step S1360, the alignment unit 204 performs alignment at the inspection setting for the preprint region. In this embodiment, alignment based on the periphery position of the reference medium is performed even for the preprint region as in step S1350. When an error of the preprint position on a reference medium is smaller than an error of alignment based on the feature point of a preprint picture, the alignment accuracy can be increased using the above-mentioned setting. When an error of the preprint position on a reference medium is larger than an error of alignment based on the feature point of a preprint picture, alignment based on the preprint region may be employed.

In step S1370, as in step S1050 of the second embodiment, the alignment unit 204 generates an overall transformed image by combining the results of alignment processing on the picture region, peripheral region, and preprint region of a reference image 301.

In step S1380, as in steps S1060 and S1070 of the second embodiment, an inspection processing unit 205 inspects a defect on the inspection target medium by comparing the target image and the overall transformed image. In this embodiment, defect detection in the preprint region uses the reference image aligned based on the periphery position of the medium.

In step S1390, the inspection processing unit 205 determines whether the inspection has ended for all target images. If the inspection has not ended, the process returns to step S1310. If the inspection has ended, the inspection processing ends.

According to the sixth embodiment, inspection can be performed even for the preprint region at the inspection setting of the preprint region. For example, a defect in the preprint region can be detected accurately using a reference image aligned based on the periphery position of a medium in inspection processing for the preprint region. The inspection accuracy can be increased not only by using inspection settings different between the picture region and the peripheral region, but also by using inspection settings different between the first region (picture region) of an image and the second region (preprint region) of the image. An inspection setting different from those of the picture region and the peripheral region may be used for the preprint region.

By using a similar method, a read image of a reference medium can also be composited at the compositing settings of the picture region, the peripheral region, and the preprint region. For example, a composite image used for inspection can be generated by performing compositing processing according to the fourth embodiment for the picture region and the peripheral region, and performing alignment and then compositing processing in the above-described way for the preprint region. For example, compositing processing based on averaging may be selected for the preprint region as well as the picture region.

Further Embodiments

The arrangements of the image obtaining unit 201 and the image reading device 105 are not particularly limited. For example, the type of image obtained by the image obtaining unit 201 is not limited, and the image may be an RGB color image, a grayscale image, or a monochrome image.

Although the image reading device 105 reads a reference medium first and then reads an inspection target medium in the first and second embodiments, the generation order of a reference image and a target image by the image reading device is not particularly limited. In each embodiment, the image obtaining unit 201 may obtain a reference image, a target image, or a read image from an auxiliary storage device (not shown). The reference image and the target image may be arbitrary images that allow calculating a difference between the reference image and the target image for inspection of the target image. The read image may be an arbitrary image that allows creating a reference image for inspection of the target image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
one or more memories storing instructions; and
one or more processors that execute the instructions to:
    detect an area within a predetermined distance from an edge of an inspection target medium as a margin area, the predetermined distance being configurable by a user in advance;
    configure a first inspection setting for a print area of the inspection target medium having undergone printing and a second inspection setting for the margin area of the inspection target medium, wherein the first inspection setting is different from the second inspection setting;
    detect, based on the first inspection setting, a defect in the print area of the inspection target medium; and
    detect, based on the second inspection setting, a defect in the margin area of the inspection target medium.

2. The image processing apparatus according to claim 1, wherein the one or more processors execute the instructions to inspect the margin area by comparing information of the margin area with preset feature information.

3. The image processing apparatus according to claim 2, wherein the preset feature information is selected in accordance with a type of the inspection target medium.

4. The image processing apparatus according to claim 2, wherein the preset feature information is brightness information of blank paper.

5. The image processing apparatus according to claim 1, wherein the one or more processors execute the instructions to determine whether a target area in an image of the inspection target medium is the print area or the margin area.

6. The image processing apparatus according to claim 1, wherein the one or more processors execute the instructions to determine whether the target area is the print area or the margin area based on a print position error amount in the printing on the inspection target medium.

7. An image processing method comprising:
detect an area within a predetermined distance from an edge of an inspection target medium as a margin area, the predetermined distance being configurable by a user in advance;
configuring a first inspection setting for a print area of the inspection target medium having undergone printing and a second inspection setting for the margin area of the inspection target medium, wherein the first inspection setting is different from the second inspection setting;
detecting, based on the first inspection setting, a defect in the print area of the inspection target medium; and
detecting, based on the second inspection setting, a defect in the margin area of the inspection target medium.

8. A non-transitory computer-readable medium storing a program executable by a computer to perform a method comprising:
detect an area within a predetermined distance from an edge of an inspection target medium as a margin area, the predetermined distance being configurable by a user in advance;
configuring a first inspection setting for a print area of the inspection target medium having undergone printing and a second inspection setting for the margin area of the inspection target medium, wherein the inspection setting is different from the second inspection setting;
detecting, based on the first inspection setting, a defect in the print area of the inspection target medium; and
detecting, based on the second inspection setting, a defect in the margin area of the inspection target medium.

9. The image processing apparatus according to claim 1, wherein the one or more processors detects the defect in the margin area based on a read image of the inspection target medium and a reference image.

10. The image processing apparatus according to claim 1, wherein the one or more processors detects the defect in the margin area by comparing a read image of the inspection target medium with a reference image.

* * * * *